US009686574B2

(12) United States Patent
Daily et al.

(10) Patent No.: US 9,686,574 B2
(45) Date of Patent: *Jun. 20, 2017

(54) SYSTEMS AND METHODS FOR AUTONOMOUS BROADCASTING

(71) Applicant: BoxCast, LLC, Cleveland, OH (US)

(72) Inventors: Gordon R. Daily, Cleveland, OH (US); Justin R. Hartman, Twinsburg, OH (US); Joel S. Helbling, Berea, OH (US); Ronald C. Hopper, Berea, OH (US)

(73) Assignee: BoxCast, LLC, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/188,341

(22) Filed: Jun. 21, 2016

(65) Prior Publication Data

US 2016/0301963 A1 Oct. 13, 2016

Related U.S. Application Data

(63) Continuation of application No. 14/876,080, filed on Oct. 6, 2015, which is a continuation of application
(Continued)

(51) Int. Cl.
*H04N 7/173* (2011.01)
*H04N 7/16* (2011.01)
(Continued)

(52) U.S. Cl.
CPC ..... *H04N 21/2541* (2013.01); *H04L 63/0209* (2013.01); *H04L 63/0876* (2013.01); *H04L 63/10* (2013.01); *H04N 5/262* (2013.01); *H04N 21/2187* (2013.01); *H04N 21/231* (2013.01); *H04N 21/23439* (2013.01); *H04N 21/234363* (2013.01); *H04N 21/26241* (2013.01); *H04N 21/4223* (2013.01); *H04N 21/4627* (2013.01); *H04N 21/6125* (2013.01); *H04N 21/63* (2013.01); *H04N 21/64322* (2013.01); *H04N 21/64746* (2013.01); *H04N 21/812* (2013.01)

(58) Field of Classification Search
None
See application file for complete search history.

(56) References Cited

U.S. PATENT DOCUMENTS 5,852,714 A * 12/1998 Tseng .................. H04L 12/1868
709/229
6,400,903 B1 6/2002 Conoval
(Continued)

OTHER PUBLICATIONS

Printout of web page(s) at http://arstechnica.com/old/content/2006/03/6464.ars visited on Aug. 10, 2011 (1 page).
(Continued)

*Primary Examiner* — James R Sheleheda
(74) *Attorney, Agent, or Firm* — Calfee, Halter & Griswold LLP

(57) ABSTRACT

Computer-implemented systems and methods provide for the autonomous broadcasting of video data, audio data, or video and audio data during an event, wherein the broadcasting can be schedule in advance and from a remote location (i.e., over a network).

30 Claims, 29 Drawing Sheets

Related U.S. Application Data

No. 13/045,719, filed on Mar. 11, 2011, now Pat. No. 9,167,275.

(60) Provisional application No. 61/312,773, filed on Mar. 11, 2010.

(51) Int. Cl.

| | |
|---|---|
| H04N 21/254 | (2011.01) |
| H04N 21/2187 | (2011.01) |
| H04N 21/63 | (2011.01) |
| H04N 21/231 | (2011.01) |
| H04N 21/2343 | (2011.01) |
| H04N 21/262 | (2011.01) |
| H04N 21/4223 | (2011.01) |
| H04N 21/647 | (2011.01) |
| H04N 21/81 | (2011.01) |
| H04N 21/643 | (2011.01) |
| H04L 29/06 | (2006.01) |
| H04N 5/262 | (2006.01) |
| H04N 21/4627 | (2011.01) |
| H04N 21/61 | (2011.01) |

(56) References Cited

U.S. PATENT DOCUMENTS

| | | | |
|---|---|---|---|
| 6,930,709 B1 | 8/2005 | Creamer et al. | |
| 6,980,232 B2 | 12/2005 | Suzuki | |
| 7,349,975 B2 | 3/2008 | Kikinis | |
| 7,421,454 B2 | 9/2008 | DeShan et al. | |
| 7,423,670 B2 | 9/2008 | Kawai et al. | |
| 7,516,203 B2 | 4/2009 | Watanabe et al. | |
| 7,562,380 B2 | 7/2009 | Negishi et al. | |
| 7,859,571 B1* | 12/2010 | Brown | G08B 13/19645 348/211.3 |
| 8,121,078 B2 | 2/2012 | Siann et al. | |
| 9,167,275 B1* | 10/2015 | Daily | H04N 21/812 |
| 2002/0026636 A1 | 2/2002 | LeComte | |
| 2004/0078825 A1* | 4/2004 | Murphy | H04N 7/147 725/109 |
| 2004/0243922 A1* | 12/2004 | Sirota | G06Q 10/109 715/233 |
| 2005/0200714 A1* | 9/2005 | Marchese | G06F 17/3025 348/211.3 |
| 2005/0251832 A1 | 11/2005 | Chiueh | |
| 2005/0289618 A1 | 12/2005 | Hardin | |
| 2006/0051060 A1 | 3/2006 | Dorovanessian et al. | |
| 2006/0129458 A1 | 6/2006 | Maggio | |
| 2006/0171453 A1* | 8/2006 | Rohlfing | G08B 13/19632 375/240.01 |
| 2006/0279628 A1 | 12/2006 | Fleming | |
| 2008/0040453 A1 | 2/2008 | Cohen | |
| 2008/0168522 A1 | 7/2008 | Choi | |
| 2008/0218498 A1* | 9/2008 | Yoshioka | G06F 21/34 345/204 |
| 2009/0049491 A1* | 2/2009 | Karonen | H04L 65/604 725/105 |
| 2009/0055873 A1 | 2/2009 | Kim | |
| 2009/0066788 A1* | 3/2009 | Baum | G06F 17/30017 348/143 |
| 2009/0070477 A1 | 3/2009 | Baum et al. | |
| 2009/0070804 A1 | 3/2009 | Liao | |
| 2009/0113500 A1* | 4/2009 | Frenkel | H04N 5/232 725/109 |
| 2009/0113505 A1 | 4/2009 | Yu | |
| 2009/0144400 A1* | 6/2009 | Kunito | H04L 65/80 709/220 |
| 2009/0150936 A1 | 6/2009 | Lee et al. | |
| 2009/0183213 A1 | 7/2009 | Mukerji et al. | |
| 2009/0183217 A1 | 7/2009 | Mukerji et al. | |
| 2009/0199234 A1* | 8/2009 | Mukerji | G06Q 20/10 725/34 |
| 2009/0245268 A1* | 10/2009 | Pugliese, IV | H04L 12/10 370/401 |
| 2009/0255268 A1 | 10/2009 | Kaleeswaran et al. | |
| 2009/0317056 A1 | 12/2009 | Hu et al. | |
| 2009/0318224 A1 | 12/2009 | Ealey | |
| 2009/0319574 A1 | 12/2009 | Burgard et al. | |
| 2010/0030744 A1 | 2/2010 | DeShan et al. | |
| 2010/0135643 A1* | 6/2010 | Fleming | G11B 27/034 386/224 |
| 2010/0172403 A1 | 7/2010 | Rabenold et al. | |
| 2010/0180311 A1 | 7/2010 | Gordon | |
| 2010/0195826 A1* | 8/2010 | Lee | H04L 63/0428 380/200 |
| 2010/0195827 A1 | 8/2010 | Lee et al. | |
| 2011/0099286 A1 | 4/2011 | Krikorian et al. | |
| 2011/0154204 A1 | 6/2011 | Narayanaswamy | |
| 2012/0268596 A1* | 10/2012 | Frenkel | H04N 5/232 348/143 |
| 2012/0331109 A1* | 12/2012 | Baum | G06F 17/30017 709/219 |
| 2013/0194431 A1* | 8/2013 | O'Connor | H04N 21/21805 348/159 |
| 2013/0198044 A1* | 8/2013 | O'Connor | H04N 21/21805 705/27.1 |
| 2013/0214909 A1* | 8/2013 | Meijers | H04W 4/008 340/10.5 |
| 2013/0239148 A1* | 9/2013 | Wilson | G08B 13/1968 725/48 |
| 2016/0029102 A1* | 1/2016 | Daily | H04N 21/812 725/93 |

OTHER PUBLICATIONS

Printout of web page(s) at http://arstechnica.com/old/content/2006/08/7493.ars visited on Aug. 10, 2011 (1 page).
Printout of web page(s) at http://www.dbstalk.com/showthread.php?t=109671 visited on Aug. 31, 2011 (7 pages).
Printout of web page(s) at watch.slingbox.com visited on Aug. 10, 2011 (1 page).
Printout of web page(s) at http://forums.crackberry.com/blackberry-bold-9700-f146/trendnet-security-camera-streaming-blackberry-os-407945/index2.html visited on Aug. 10, 2011 (6 pages).
Printout of web page(s) at controlbynet.com/inthenews.php visited on Aug. 10, 2011 (1 page).
Printout of web page(s) at http://cube.teradek.com/ visited on Aug. 10, 2011 (1 page).
Printout of web page(s) at http://www.prnewswire.com/news-releases/comcast-adds-remote-dvr-scheduling-launches-anyroom-dvr-and-upgrades-on-screen-program-guide-in-massachusetts-and-new-hampshire-101370429.html visited on Aug. 10, 2011 (3 pages).
Zhao et al., Broadcast system source codes: a new paradigm for data compression, 1999 IEEE, California Institute of Technology Department of Electrical Engineering.
Zhou et al., A web-based management system for H.264 live video broadcasting, 2007 IEEE, Ningbo Institute of Technology. Zhejiang University, China.
www.yourschoollive.com archived screenshots from Oct. 6, 2009, 1 page.
www.yourschoollive.com archived screenshots from Dec. 1, 2009, 1 page.
www.yourschoollive.com archived screenshots from Jan. 6, 2010, 1 page.
www.yourschoollive.com archived screenshots from Mar. 10, 2010, 1 page.
www.yourschoollive.com archived screenshots from May 27, 2010, 1 page.
www.yourschoollive.com archived screenshots from Feb. 8, 2011, 1 page.
www.yourschoollive.com archived screenshots from Sep. 1, 2009, 3 pages.
www.yourschoollive.com archived screenshots from Feb. 6, 2010, 1 page.

* cited by examiner

900

900

900

SYSTEMS AND METHODS FOR AUTONOMOUS BROADCASTING

RELATED APPLICATION

The present application is being filed as a continuation of U.S. non-provisional patent application Ser. No. 14/876,080 entitled SYSTEMS AND METHODS FOR AUTONOMOUS BROADCASTING and filed on Oct. 6, 2015, which is a continuation of U.S. non-provisional patent application Ser. No. 13/045,719 entitled SYSTEMS AND METHODS FOR AUTONOMOUS BROADCASTING and filed on Mar. 11, 2011, which issued as U.S. Pat. No. 9,167,275 on Oct. 20, 2015 and which claims priority/benefit under 35 U.S.C. §119(e) from U.S. provisional patent application No. 61/312,773 entitled SYSTEMS AND METHODS FOR AUTONOMOUS BROADCASTING and filed on Mar. 11, 2010, the entire disclosures of which are incorporated herein by reference.

FIELD

The general inventive concepts relate to data transmission and, in particular, to scheduling the autonomous broadcasting of data.

BACKGROUND

Various systems exist for broadcasting a live or pre-recorded video stream over the Internet. These conventional systems, however, have numerous drawbacks.

For example, in conventional systems, broadcast devices cannot be controlled remotely when the devices are situated behind a user's firewall.

One attempt to address this drawback involves configuring the user's router to give access to the broadcast device. This approach involves, for example, creating or otherwise exploiting a "hole" in the firewall, such as by forwarding Transmission Control Protocol (TCP) or User Datagram Protocol (UDP) ports to the broadcasting device so that the user could use Hypertext Transfer Protocol (HTTP), SSH, Remote Procedure Call (RPC), or the like to control the broadcasting device remotely, or designing the user's network to include a demilitarized zone (DMZ), wherein the broadcast device is placed in the DMZ so it can be controlled remotely. This approach, however, requires technical expertise that the average user may not possess. Furthermore, this approach also exposes the broadcast device to unauthorized and/or malicious use by allowing others to potentially access the broadcast device behind the firewall. For example, the broadcast device could be subject to denial of service attacks, rendering the device useless or otherwise ineffective. Further still, certain broadband routers/firewalls do not allow broadcast streaming, wherein users with these routers/firewalls installed often have no way of knowing that this is the reason they cannot broadcast.

Another attempt to address this drawback involves installing a virtual private network (VPN) relay server. Again, this approach requires a degree of technical expertise that the average user may not possess, and is often performed by an information technology (IT) specialist. Furthermore, the VPN server and software are expensive, which may present a cost barrier to implementation for many users. Additionally, this approach requires that VPN credentials be maintained between VPN clients and VPN servers, which adds complexity and overhead. As noted above, because certain broadband routers/firewalls do not allow broadcast streaming, users with these routers/firewalls installed often have no way of knowing that this is the reason they cannot broadcast.

Yet another attempt to address this drawback involves controlling the broadcast device on-site (i.e., not remotely). This approach, however, requires that an administrator or other authorized user be on site to control the broadcast device. Additionally, if the administrator delegates someone else to control the broadcast device, there is a risk that the person may knowingly or unknowingly alter the desired configuration, given the complexity of setting the proper broadcast parameters. As noted above, because certain broadband routers/firewalls do not allow broadcast streaming, users with these routers/firewalls installed often have no way of knowing that this is the reason they cannot broadcast.

As another drawback of conventional broadcasting systems, the broadcasting systems utilize a broadband connection (for network traffic) that provides an insufficient or otherwise poorly sufficient upload speed.

One attempt to address this drawback involves using broadcast software running on a general purpose computer to compress the video before transmitting it. However, if the broadcast device is the general purpose computer, the computer may not be powerful and/or fast enough to effectively perform the compression and transmit the video. Computers that are powerful and fast enough to perform the compression and transmission are likely to be expensive, which may present a cost barrier to implementation for many users. Additionally, users are required to spend time and/or money to purchase, download, install, and maintain the compression software. Furthermore, the broadcast software may require a steep learning curve of its users. Since the average user does not know how the broadcast software functions work and/or which settings are important in the broadcast software, the user may become frustrated and/or waste a significant amount of time.

Another attempt to address this drawback involves using dedicated broadcasting hardware. Such dedicated hardware is likely to be expensive, which may present a cost barrier to implementation for many users. Furthermore, the hardware may require a steep learning curve of its users. Since the average user does not know how the broadcast software functions work and/or which settings are important for the hardware, the user may become frustrated and/or waste a significant amount of time.

As yet another drawback of conventional broadcasting systems, the broadcasting systems may not adequately prevent unauthorized access to the video being broadcast. Users often want broadcasts to be viewable only by certain viewers to control privacy and/or insure that paid broadcasts cannot be stolen or otherwise misappropriated.

One attempt to address this drawback involves security through obscurity. For example, when an event is being promoted through an e-mail or similar invite, the e-mail includes an invitation link containing a long complex web address having enough complexity such that the chance of guessing the link becomes acceptably small. However, when a viewer prints out the e-mail invite, the process of typing in the long complex web address is onerous and it is very difficult for the viewer to accurately type in the long complex web address. Consequently, the viewer is apt to become frustrated and to forego accessing or otherwise viewing the video.

Another attempt to address this drawback involves authenticating a viewer requesting access to an event by requiring a username and password. However, if any unauthorized viewers obtain these credentials, then the unauthorized viewers and/or anyone else they provide the information can view the video being broadcast for the event. Additionally, even without obtaining the credentials, an unauthorized viewer situated between a video player for playing the video and a media server for providing the video could "sniff" for the video data (i.e., the video stream) as it is transmitted from the media server to the player. In this manner, the unauthorized viewer could view the video stream without anyone else knowing.

As still another drawback of conventional broadcasting systems, an event to be broadcast may be so popular that a server delivering the video of the event reaches its capacity or breaks, such that viewers that want to view the video cannot.

An attempt to address this drawback involves using a content delivery network (CDN) to provide the ability to service any size event. However, in using the CDN, overall capacity may not be dynamically adjustable. Accordingly, an administrator may be forced to set a predefined limit on the capacity, which results in either wasted server capacity or rejecting certain viewers who wish to view the video.

As another drawback of conventional broadcasting systems, the broadcasting systems require someone to be on-site to turn the camera on and off for an event to be broadcast. No known attempts have been made to address this drawback.

The general inventive concepts contemplate systems, methods, and apparatuses for use in scheduling and otherwise carrying out the autonomous broadcasting of video data. Exemplary embodiments of the general inventive concepts, including those disclosed herein, may or may not address one or more of the aforementioned drawbacks and/or any other drawbacks of conventional broadcasting systems.

SUMMARY

The general inventive concepts contemplate computer-implemented systems and methods, as well as apparatuses for use therein, for remotely scheduling autonomous broadcasting of video data in advance.

In one exemplary embodiment, a system for scheduling broadcasting of video data is disclosed. The system includes scheduling logic, a video acquisition device, a broadcasting device, a plurality of media servers, and a network. The scheduling logic is in data communication with the broadcasting device and the media servers over the network. The scheduling logic interfaces with a first user to allow the first user to set a start time and an end time (or duration) for an event. The scheduling logic transmits the start time and the end time to the broadcasting device over the network. The scheduling logic manages an actual bandwidth on the media servers during the event. At the start time, the broadcasting device powers on the video acquisition device and transmits video data acquired by the video acquisition device to the media servers over the network. The media servers transmit the video data as a live video stream to a second user over the network. At the end time, the broadcasting device powers off the video acquisition device.

In one exemplary embodiment, a method of scheduling broadcasting of video data is disclosed. The method includes the steps of receiving a start time and an end time (or duration) for an event from a first user; transmitting the start time and the end time to a broadcasting device remote from the first user, the broadcasting device being interfaced with a video acquisition device; reserving an estimated bandwidth on at least one media server for the event; at the start time, powering on the video acquisition device and transmitting video data acquired by the video acquisition device during the event to the at least one media server; transmitting the video data from the at least one media server as a live video stream to a second user remote from the broadcasting device; and at the end time, powering off the video acquisition device.

In one exemplary embodiment, a method of broadcasting video data is disclosed. The method includes providing an autonomous broadcasting device and a video acquisition device. After the autonomous broadcasting device is manually activated (e.g., powered on, connected to the Internet), it automatically (i.e., without any user intervention at the site of the autonomous broadcasting device) establishes communication with a website over a network; downloads scheduling data from the website, the scheduling data defining at least one event to be broadcast by the autonomous broadcasting device; determines a start time and an end time for an event from the scheduling data; at the start time, powers on the video acquisition device; receives video data corresponding to the event from the video acquisition device; uploads the video data to a server contemporaneously with the event; and at the end time, powers off the video acquisition device.

In one exemplary embodiment, a broadcasting device for broadcasting video data in accordance with a user-defined schedule is disclosed. The broadcasting device includes a processor, a memory, a video input, an audio input, and a network connector. The network connector is operable to interconnect the broadcasting device to a network. The processor is operable to cause storage of a start time and an end time (or duration) for an event in the memory; to power on a video acquisition device at the start time; to manage receipt of video data by the video input from the video acquisition device; to manage receipt of audio data by the audio input from the video acquisition device; to manage transmission and encoding (e.g., compression, optimization, formatting) of the video data to a server over the network; to manage transmission and encoding (e.g., compression, optimization, formatting) of the audio data to the server over the network; and to power off the video acquisition device at the end time.

In accordance with exemplary broadcasting systems and methods disclosed herein, a user can remotely schedule a broadcasting device to autonomously broadcast video data at a scheduled time, even when the broadcasting device is situated behind a firewall or router. In particular, the general inventive concepts encompass broadcasting devices that sit within a firewall and allow broadcasting to be controlled without breaking any IT department regulations and without requiring any configuration changes to the firewall or router. Additionally, the general inventive concepts encompass a mechanism by which the broadcasting device can determine if the firewall or router is preventing broadcasting and, if so, notifying the user of how to resolve the issue. Accordingly, no IT personnel need to be on site for initial hardware, software, or network setup nor ongoing operation of the autonomous broadcasting systems and methods.

In accordance with exemplary broadcasting systems and methods disclosed herein, the broadcasting devices utilize dedicated hardware that is optimized for video and audio compression, which results in improved performance and lower costs (as expensive general purposes computers are not required). The broadcasting devices can dynamically optimize the live stream quality to provide the best picture and resolution for a given uplink speed. Furthermore, the broadcasting devices can record the event at a higher quality while streaming the event at a lower quality. Here, higher quality can mean, for example, any one or any two or more of the following: higher video resolution, lower video compression loss; increased audio quality, larger size, and/or increased frame rate. Then, after the event has completed, the higher quality video is compressed and uploaded to a server at any upload speed the network connection supports. The recorded streams can be made available at the lower live stream quality until the higher quality stream is fully uploaded and saved.

In accordance with exemplary broadcasting systems and methods disclosed herein, unauthorized access to the broadcast video is discouraged, prevented, made more difficult, or otherwise reduced. In one exemplary embodiment, the systems and methods control access to the video using streams that are encrypted or otherwise protected, such that only authorized viewers can watch the video. In one exemplary embodiment, the video streams are protected using RTMP/RTSP (Real Time Messaging Protocol/Real Time Streaming Protocol) authentication or the like to prevent unauthorized streaming. In one exemplary embodiment, the video streams each require a Session Description Protocol (SDP) configuration on the media server which is uploaded from the scheduling logic via secure copy. In one exemplary embodiment, the video streams are encrypted using Encrypted Real Time Messaging Protocol (RTMPE) or another encryption protocol. In one exemplary embodiment, access to the video streams is only available through a secure token that must match between the viewer and the streaming server, which prevents access to video streams using an unauthorized client. In combination with encryption, this prevents a "middle man" from "sniffing" the video stream and viewing or redistributing its content. This could be implemented, for example, using the SecureToken module for Wowza Media Server. In one exemplary embodiment, a video stream may be restricted by single-access tokens, which prevents a viewer from sharing his URL with a friend. Only one client can view the video stream at a time given for a unique token (like a ticket to an event).

In accordance with exemplary broadcasting systems and methods disclosed herein, the systems and methods utilize cloud computing or similar services in order to provide for the dynamic scaling of server bandwidth. In this manner, user demand for the video, whether streaming or pre-recorded, can be dynamically accommodated.

In accordance with exemplary broadcasting systems and methods disclosed herein, the broadcasting devices include or are interfaced with logic that allows any video and/or audio acquisition device (e.g., a digital camera) to be remotely powered on and powered off based on scheduled events. In one exemplary embodiment, the broadcasting devices include a USB port through which an automatic camera power controller is attached to the broadcasting device. The automatic camera power controller comprises a wall plug that itself acts as a plug for the camera that switches power ON to the camera plug when the broadcasting device is ready to acquire and transmit data and switches power OFF to the camera plug when the broadcasting has completed.

In accordance with exemplary broadcasting systems and methods disclosed herein, a commissioning process and a registration process are contemplated. The commissioning process involves adding software onto a processor representing broadcasting hardware to form a broadcasting device (e.g., a device capable of transmitting live video data to a server). During the commissioning process, unique credentials are assigned to the broadcasting device and shared with scheduling logic. By sharing these credentials between the broadcasting device and the scheduling logic, the broadcasting device can be securely authenticated by the scheduling logic when a content provider seeks to deploy the broadcasting device in the broadcasting systems and methods. Likewise, the registration process is a process by which the broadcasting device is recognized (based on its unique credentials) and added to the broadcasting systems and methods. The broadcasting device must be registered before a content provider can schedule broadcasting events for it. Upon activation (i.e., being connected to the Internet and powered on), the broadcasting device is capable of registering itself without further user intervention by automatically exchanging data (e.g., HTTP messages) with the scheduling logic.

Numerous advantages and features attributable to the general inventive concepts will become readily apparent from the following detailed description of exemplary embodiments, from the claims and from the accompanying drawings.

BRIEF DESCRIPTION OF THE DRAWINGS

For a fuller understanding of the nature and advantages of the general inventive concepts, reference should be had to the following detailed description taken in connection with the accompanying drawings, in which.

DESCRIPTION

Figure 1:
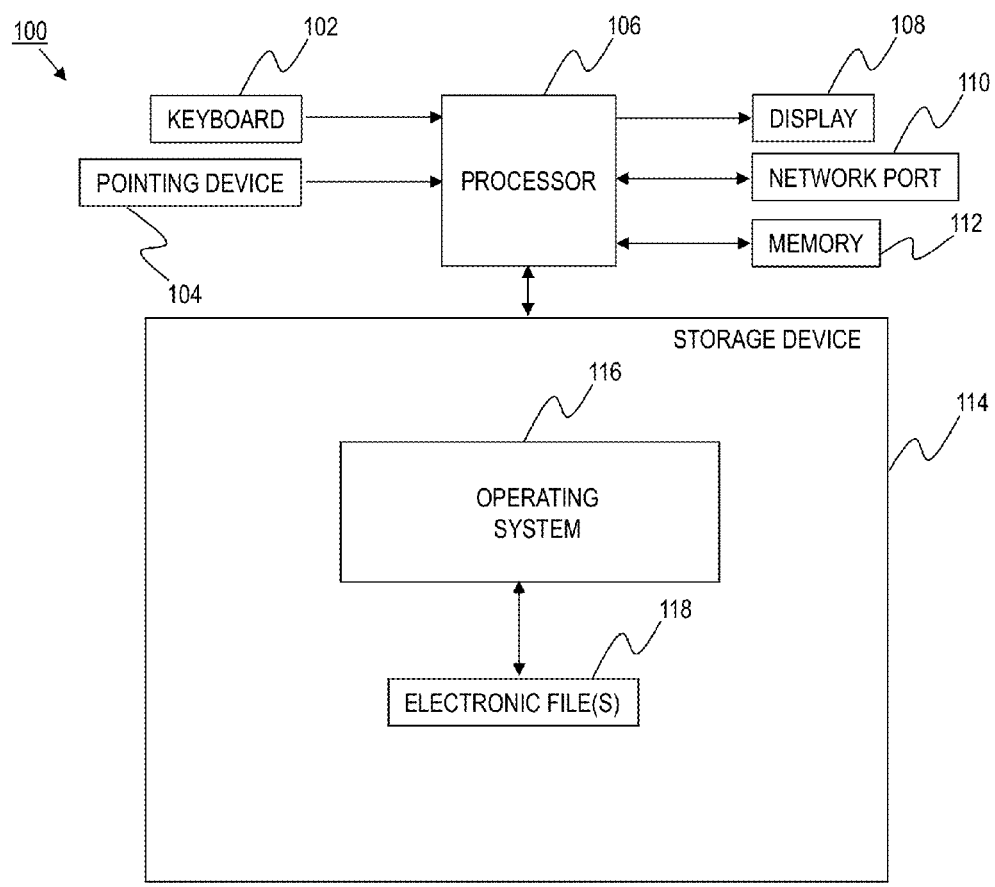
FIG. 1 is a diagram of a computer for use in an autonomous broadcasting system and/or for implementing an autonomous broadcasting method, according to one exemplary embodiment.

While the general inventive concepts are susceptible of embodiment in many different forms, there are shown in the drawings and will be described herein in detail specific embodiments thereof with the understanding that the present disclosure is to be considered as an exemplification of the principles of the general inventive concepts. Accordingly, the general inventive concepts are not intended to be limited to the specific embodiments illustrated herein.

The following includes definitions of exemplary terms used throughout the disclosure. Both singular and plural forms of all terms fall within each meaning:

"Logic," synonymous with "circuit" as used herein includes, but is not limited to, hardware, firmware, software and/or combinations of each to perform a function(s) or an action(s). For example, based on a desired application or needs, logic may include a software controlled microprocessor, discrete logic such as an application specific integrated circuit (ASIC), programmed logic device, or other processor. Logic may also be fully embodied as software.

"Software," as used herein, includes but is not limited to one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"Computer" or "processor" as used herein includes, but is not limited to, any programmed or programmable electronic device or coordinated devices that can store, retrieve, and process data and may be a processing unit or in a distributed processing configuration.

In accordance with the general inventive concepts, disclosed herein are exemplary embodiments of systems and methods for scheduling broadcasting of video data. FIG. 1 shows a computer 100 (e.g., a general purpose desktop or laptop computer) for use in a video broadcasting system and/or a video broadcasting method, according to one exemplary embodiment.

The computer 100 includes a processing means, such a CPU 106, and memory, such as RAM 112, for use by the processing means. The computer 100 also includes input means, such as a keyboard 102 and a mouse 104, and output means, such as a monitor 108. The monitor can be, for example, an LCD or CRT display. The output means can include any device or mechanism for outputting signals generated by the computer 100. For example, the output means could include speakers (not shown) for outputting audio.

The computer includes a permanent and/or semi-permanent storage means, such as a hard disk drive 114. The hard disk drive 114 can be used to store software applications, such as an operating system 116, and/or data in the form of electronic files 118. The computer 100 further includes a networking means, such as a network port or adapter 110. The network adapter 110 can be, for example, an Ethernet adapter. The network adapter 110 allows the computer 100 to be connected to and communicate over a network, such as the Internet. The network adapter 110 can support, for example, wired or wireless communication over the network.

Various modifications could be made to the computer 100 without departing from the spirit and scope of the general inventive concepts. The computer 100 can be configured and used as a client and/or a server computer.

Figure 2:
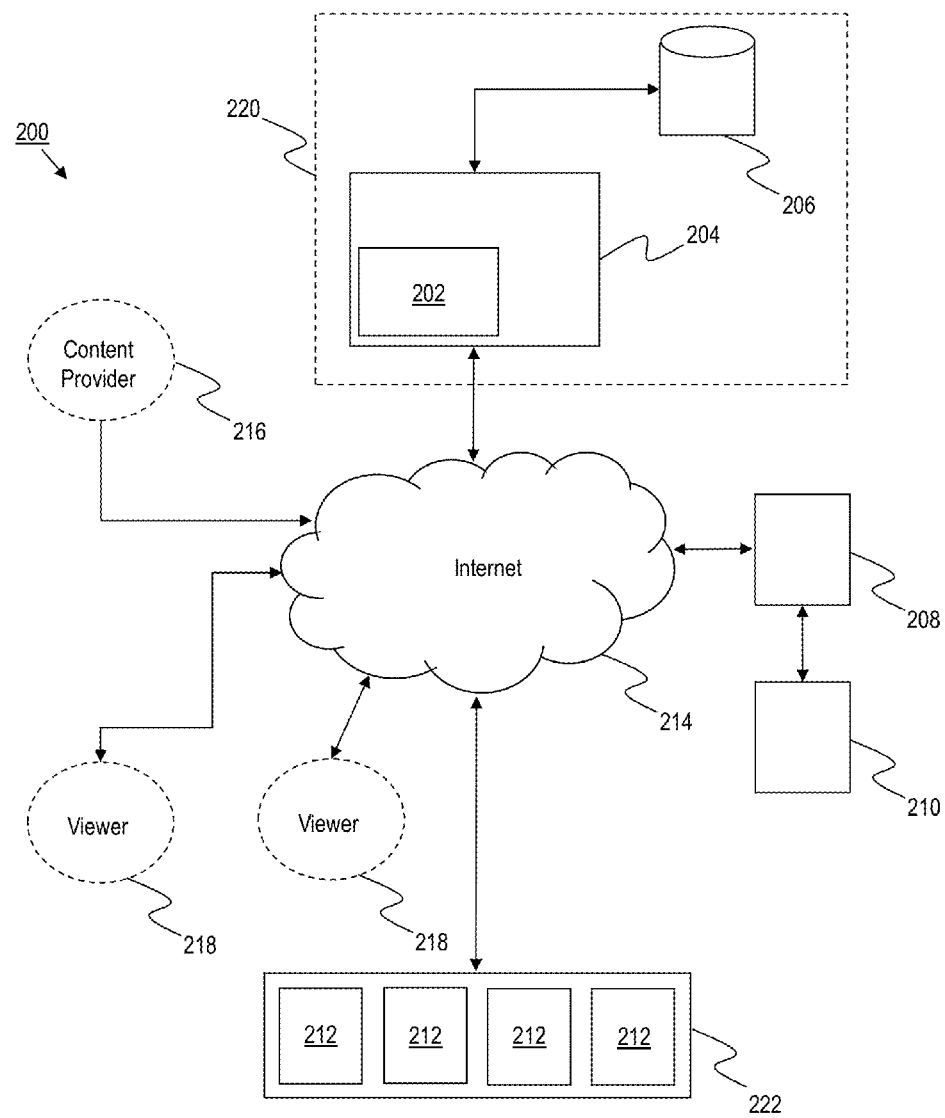
FIG. 2 is a diagram of an autonomous broadcasting system, according to one exemplary embodiment.

As shown in FIG. 2, an autonomous broadcasting system 200, according to one exemplary embodiment, includes scheduling software 202 installed on a server computer 204. The server computer 204 can be a general purpose computer, such as computer 100. The server computer 204 is in data communication with a data store 206. In one exemplary embodiment, the data store 206 is installed in the server computer 204.

The autonomous broadcasting system 200 also includes a broadcasting node or device 208, a video acquisition device 210, and a plurality of media servers 212. In one exemplary embodiment, a content delivery network (CDN) may be used. Additionally, the autonomous broadcasting system 200 includes a network, such as a wide area network (WAN) or the Internet 214, over which the server computer 204 with the scheduling software 202, the broadcasting device 208, and the media servers 212 can communicate.

In one exemplary embodiment, the broadcasting device 208 utilizes a processor system such as a Leopardboard 365 (hereinafter, the "Leopardboard"), as shown in FIGS. 9-14, and as described in the Leopardboard 365 Hardware Guide (Rev. 1.0), the entire disclosure of which is hereby incorporated by reference in its entirety. The Leopardboard is a processor system designed to provide a feature rich and economical solution based on Texas Instruments' Digital Media (DM) DM365 processor. This processor is dedicated, specialized hardware designed to support the acquisition, encoding, compression, etc. of video and audio data. Since the Leopardboard does not use a digital signal processor (DSP), the DM365 processor is used for video and audio encoding. The Leopardboard supports a wide range of peripherals and, thus, provides a useful tool for digital media and storage applications The Leopardboard has a generally low power consumption level. The Leopardboard includes an internal memory controller supporting a wide range of memories including DDR2/MDDR/SDRAM/NOR & NAND FLASH. The Leopardboard has a built-in Multimedia Card/Secure Digital (MMC/SD) controller which could be used to provide an instant add on storage for personal collections. The Leopardboard includes an expansion port and/or other connectors that provide an interface to other cards, devices, peripherals and the like. The Leopardboard also includes a universal serial bus (USB) port that provides a wide variety of peripheral connectivity.

Many other processor systems may be used in accordance with the teachings herein. A minimum configuration for the broadcasting device 208 processor system includes a processor (e.g., the DM365 processor and/or some other processor optimized for video and audio compression), a memory, a bus interface circuit permitting the processor to communicate with the various servers described herein via the Internet, and a bus interface circuit permitting the processor to accept video and audio from the video acquisition device 210. Additionally, the processor system can include a bus interface circuit permitting the processor to communicate with a power controller associated with the video acquisition device 210.

The use of such a processor system (e.g., the Leopardboard) in the broadcasting device, as contemplated by the general inventive concepts, provides many advantages over the use of a general purpose computer (e.g., the computer 100). For example, the processor system can have a much smaller footprint than the computer. In one exemplary embodiment, the processor system is enclosed in a housing measuring less than 5 inches by 5 inches by 2 inches, e.g., approximately 4.5 inches by 4.5 inches by 1.5 inches. This allows the broadcasting device to be deployed in manners and locations that would otherwise not be possible. Furthermore, a manufacturing cost of the processor system is much lower than a manufacturing cost of the general purpose computer. Further still, the reliability of the processor system will, on average, exceed that of the general purpose computer because, for example, because the processor system, unlike the computer, typically uses no moving parts (e.g., fans, disk drives). Furthermore, the processor system on average has a much lower power consumption than the general purpose computer. In one exemplary embodiment, the broadcasting device including the processor system consumes less than 5 W of power during normal operation. In addition to providing a cost savings in the form of energy savings, this low power consumption results in the generation of less heat, which further increases the reliability of the processor system relative to the computer. Yet further still, the processor system is less likely to be exposed to intentional or incidental manipulation of its data stream than the computer. In particular, because general purpose computers are designed to interact with users, they typically interface with input devices (e.g., keyboard 102, pointing device 104). These input devices conceivably allow a user to directly or indirectly affect the data stream. Conversely, because the process system is design to work without any direct user interaction therewith and, thus, includes no interfaced input devices, users are unable to affect its data stream.

In one exemplary embodiment, the video acquisition device 210 is a digital camera capable of capturing audio and video data. The video acquisition device 210 interfaces with the broadcasting device 208 to transfer data acquired by the video acquisition device 210 to the broadcasting device 208. In one exemplary embodiment, a USB cable is used to connect the video acquisition device 210 and the broadcasting device 208 so that the data can be transferred from the video acquisition device 210 to the broadcasting device 208.

In one exemplary embodiment, the media servers 212 are general purpose computers, such as computer 100. In one exemplary embodiment, the media servers 212 are implemented as a dynamically scalable server cloud that provides the necessary server functionality. In this manner, the capital expenditure associated with the purchasing and maintaining the media servers 212 can be avoided, as the autonomous broadcasting system merely rents usage of the media servers 212 from a third-party provider of a cloud computing service (e.g., Amazon EC2) and/or a cloud storage service (e.g., Amazon S3).

Figure 3:
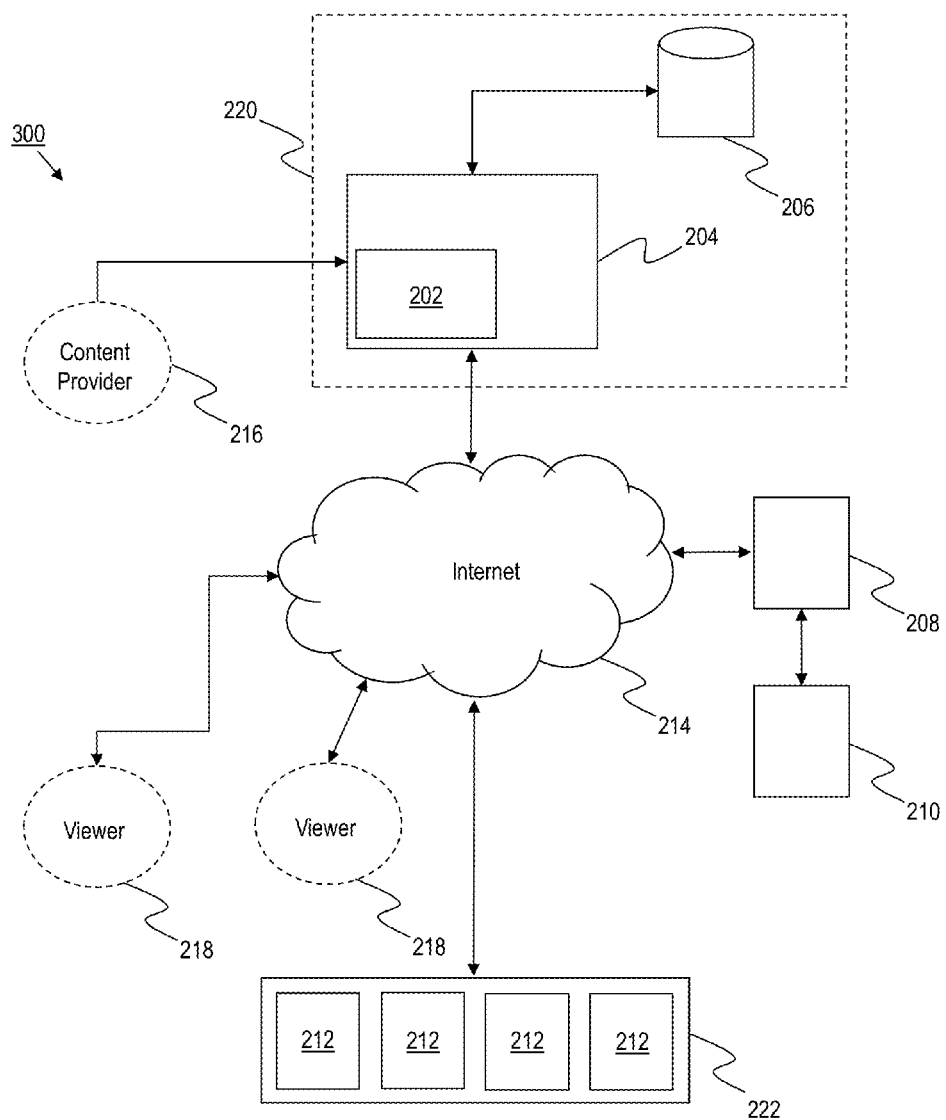
FIG. 3. is a diagram of an autonomous broadcasting system, according to one exemplary embodiment.

The autonomous broadcasting system 200 simplifies the task of broadcasting a secure live or pre-recorded video stream over the Internet. A content provider 216 using the autonomous broadcasting system 200 may securely broadcast live video by installing the broadcasting device 208 and subsequently scheduling events via the scheduling software 202 implemented as a scheduler website on the server computer 204. In the autonomous broadcasting system 200, the content provider 216 is remote from the scheduling software 202 and, thus, accesses the scheduling software 202 over the Internet 214. However, in an autonomous broadcasting system 300, according to an alternative exemplary embodiment, as shown in FIG. 3, the content provider 216 is at the same physical location as the scheduling software 202 (i.e., the server computer 204). Accordingly, in the autonomous broadcasting system 300, the content provider 216 can directly access the scheduling software 202, for example, by using an input device (not shown) of the server computer 204.

Figure 4:
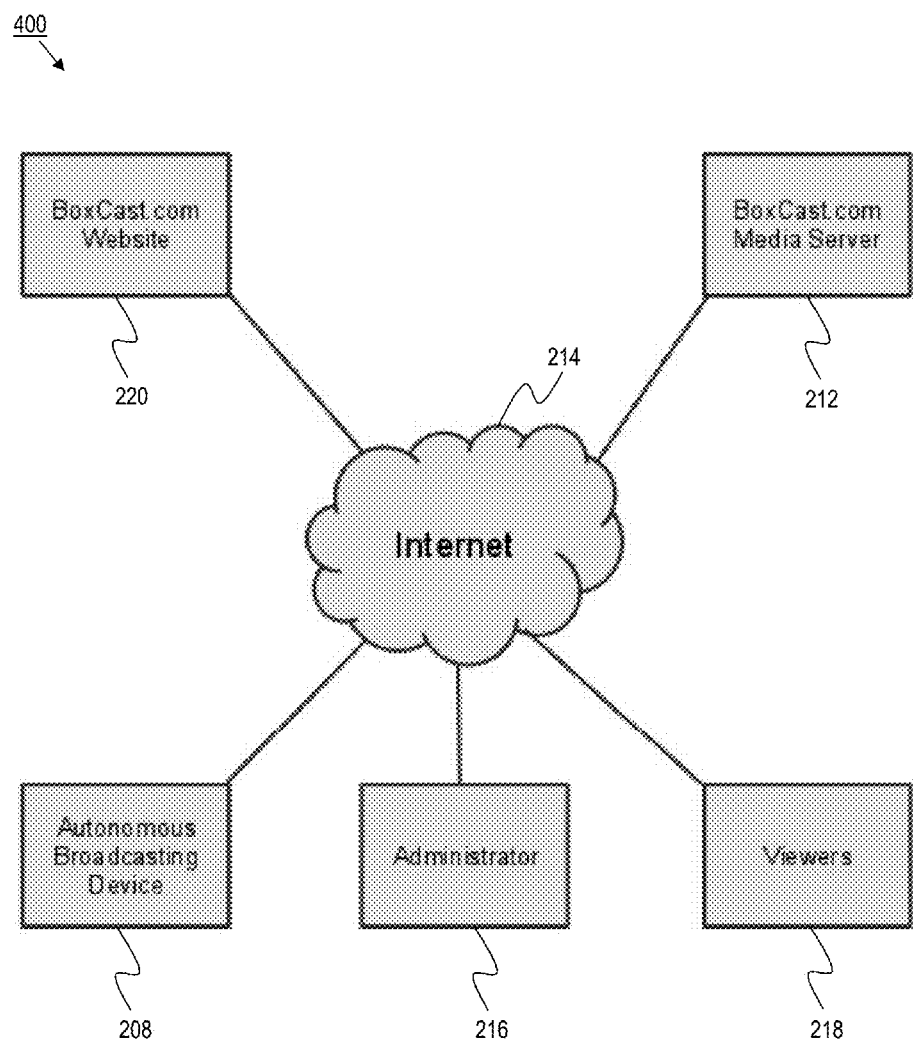
FIG. 4 is a diagram of an autonomous broadcasting system, according to one exemplary embodiment.
Figure 5:
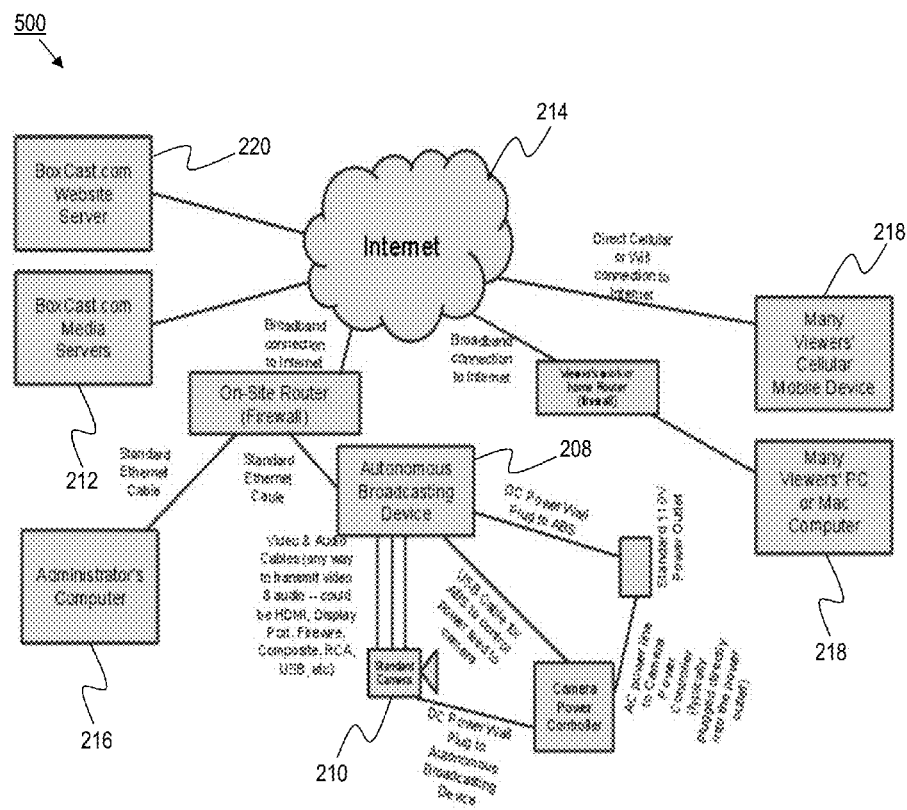
FIG. 5 is a diagram of an autonomous broadcasting system, according to one exemplary embodiment.
Figure 6:
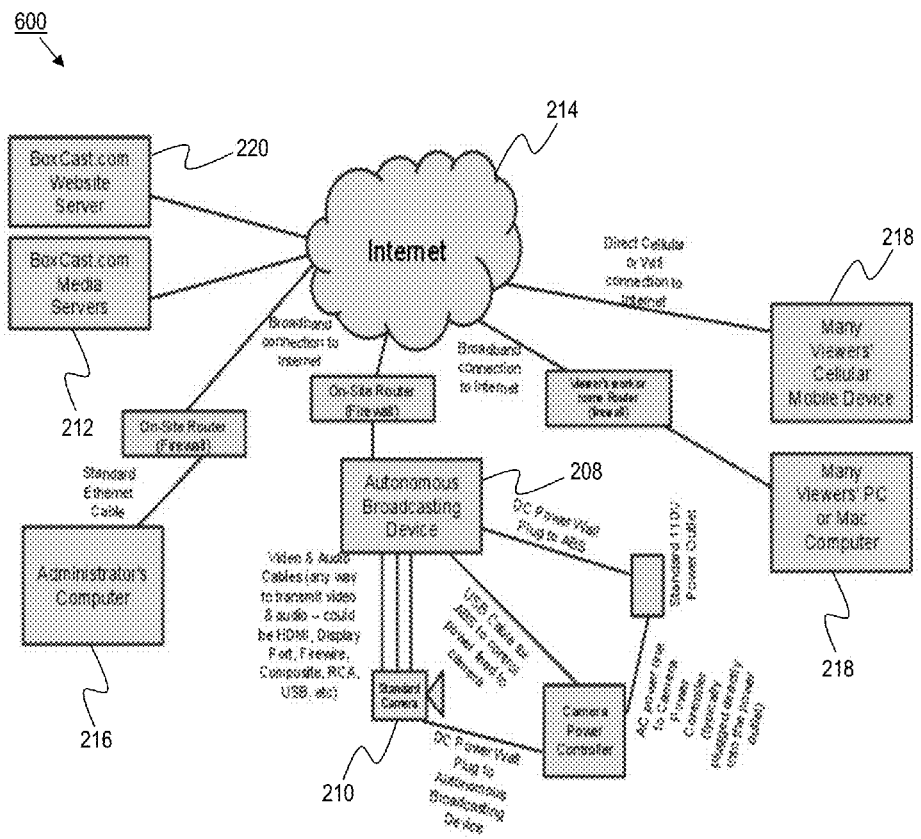
FIG. 6 is a diagram of an autonomous broadcasting system, according to one exemplary embodiment.
Figure 7:
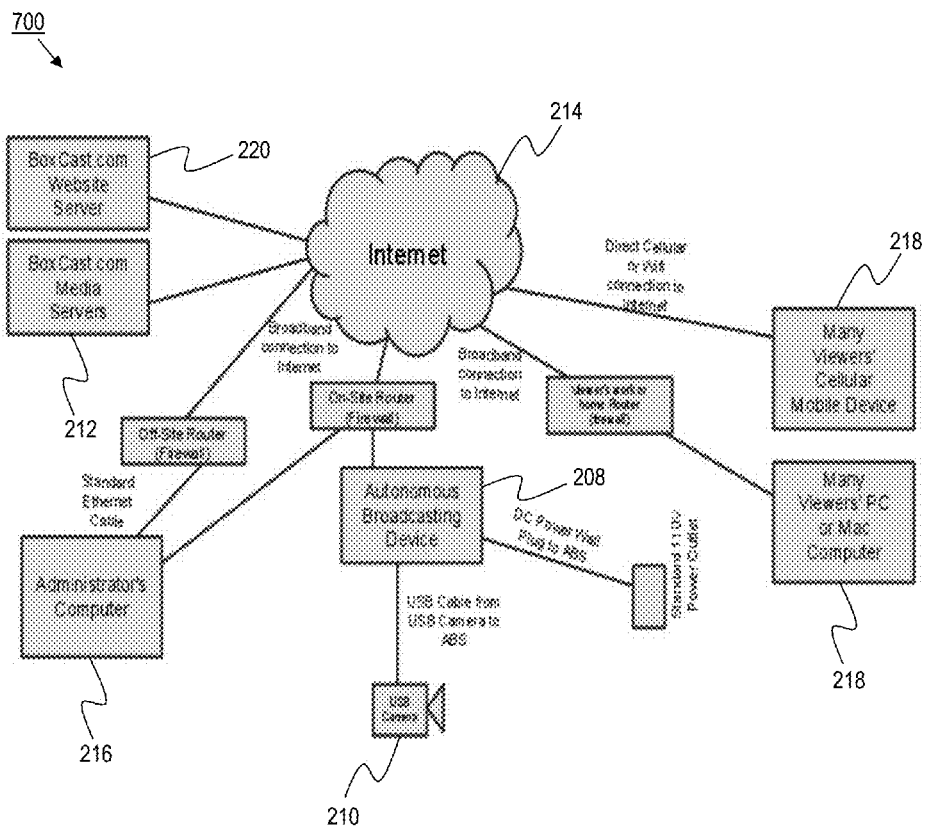
FIG. 7 is a diagram of an autonomous broadcasting system, according to one exemplary embodiment.

To further illustrate the general inventive concepts, autonomous broadcasting systems, according to other exemplary embodiments, are shown in FIGS. 4-7. FIG. 4 shows an autonomous broadcasting system 400, according to one exemplary embodiment. FIG. 5 shows an autonomous broadcasting system 500, according to one exemplary embodiment. FIG. 6 shows an autonomous broadcasting system 600, according to one exemplary embodiment. FIG. 7 shows an autonomous broadcasting system 700, according to one exemplary embodiment.

At the time that an event is scheduled to begin, the broadcasting device 208 automatically powers on any other required hardware (i.e., the video acquisition device 210) and begins encoding and publishing (i.e., uploading) a secure live video stream to the media servers 212. The media servers 212, as streaming servers, make this live video stream available to as many viewers 218 as possible by dynamically growing resources as the number of viewers 218 increases. This all happens automatically via the scheduling logic 220 as explained herein with no configuration or interaction required by the content provider 216 beyond the initial scheduling of the event. In one exemplary embodiment, the broadcasting system 200 supports the establishment of business rules to impose bandwidth growth "limits." For example, the broadcasting system 200 can set (or have as a default) a sensible limit on new accounts, say no more than 5,000 viewers allowed for the account unless and until its account status is upgraded.

Additionally, the scheduling logic 220 is responsible for directing a request from a viewer 218 to a specific media server 212 and monitoring loads of individual media servers 212. Based on these factors, the scheduling logic 220 dynamically allocates resources using the cloud computing service.

During the broadcast of the live video stream, the media servers 212, as streaming servers, may also record the broadcast onto the media servers 212, as storage servers. The recorded broadcast can then be accessed on-demand by the viewers 218 within any limits established by the content provider 216. Since the live broadcast data being uploaded essentially in real-time may be a lower quality than desired, as a result of upload bandwidth restrictions on the connection between the broadcasting device 208 and the Internet 214, the broadcasting device 208 may also record a higher quality (e.g., any one or any two or more of the following: higher video resolution, lower video compression loss; increased audio quality, larger size, and/or increased frame rate) version of the broadcast than uploaded in real-time, which it then uploads to the media servers 212, as storage servers, at some time after completion of the broadcast. Additionally, since a local copy of the video data stored on the broadcasting device 208 may be a lower quality than desired, as a result of insufficient processing power, storage limits, etc., the local copy of the video data could be used to create the higher quality (e.g., any one or any two or more of the following: higher video resolution, lower video compression loss; increased audio quality, larger size, and/or increased frame rate) version of the broadcast than uploaded in real-time, which is uploaded to the media servers 212, as storage servers, at some time after completion of the broadcast.

In the autonomous broadcasting system 200, the server computer 204 with the scheduling software 202, as well as any associated data store 206, form scheduling logic 220. A single scheduling logic 220 acts as the central hub for all the activity of the autonomous broadcasting system 200. The scheduling logic 220 houses the primary database (e.g., data store 206) of events and related information. Content providers 216 interact with the scheduling logic 220 to manage and configure events. Broadcasting devices 208 interact with the scheduling logic 220 to coordinate with the event schedule and find out where video streams should be directed.

The media servers 212 can be provided as part of a media server cloud 222. The media server cloud 222 is completely monitored and managed by the scheduling logic 220 which may acquire new instances, change configuration on instances, or release instances as needed. The viewers 218 must gain access to live or pre-recorded broadcasts through the scheduling logic 220.

The primary responsibilities of the scheduling logic 220 are to: (1) maintain the schedule of events by providing a user-interface that allows content providers 216 to manage their respective events; (2) manage the scaling of the media server cloud 222 by acquiring and releasing server instances as the needs of the system 200 change; (3) manage access of the broadcasting device 208 to the media servers 212; and (4) manage access by the viewers 218 to the secure video streams. Other responsibilities of the scheduling logic 220 may include any one or any two or more of the following: accepting a payment (e.g., by a credit card, a debit card, a PayPal account) from a viewer on behalf of a content provider for video the content provider has made available for purchase; initiating mailing of video in the form of a DVD directly from a DVD printing and fulfillment house to a viewer; coordinating and/or enforcing video sharing rules between viewers; and providing an API that allows other websites to access the scheduling logic. Additionally, any one or any two or more of these other responsibilities could be implemented via separate logic.

Figure 8:
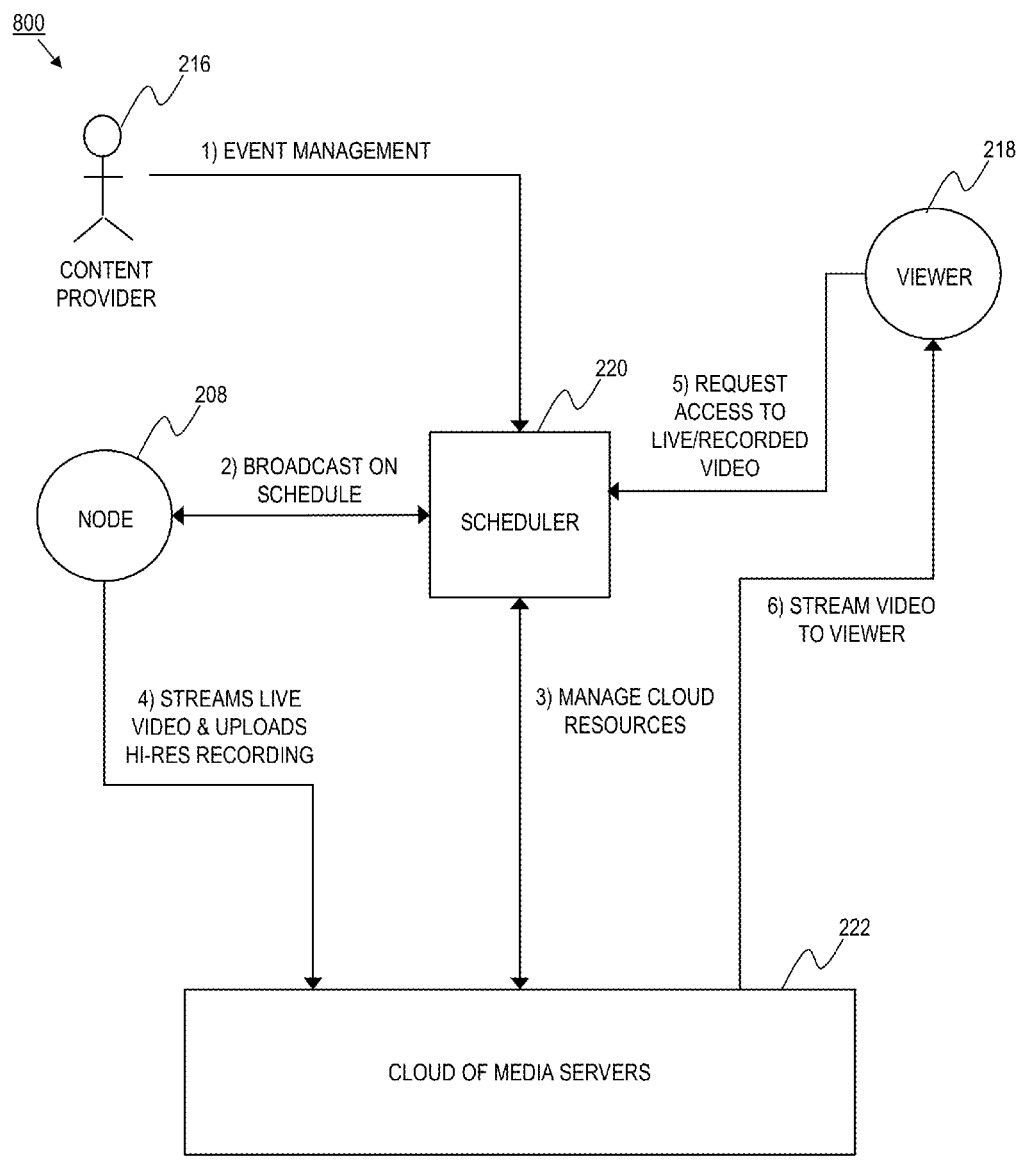
FIG. 8 is a diagram of an autonomous broadcasting system, according to one exemplary embodiment.
Figure 9:
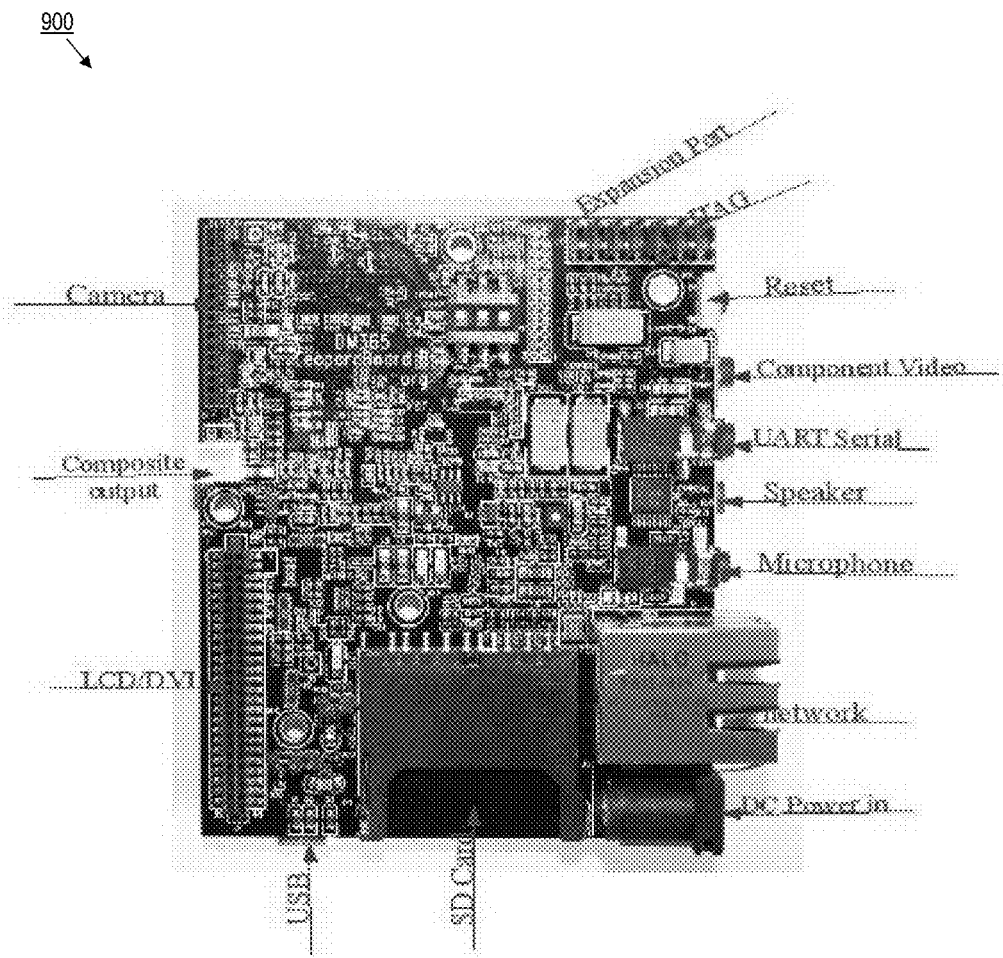
FIG. 9 is a (labeled) side elevational view of one side of a processor board, according to one exemplary embodiment, for use in a broadcasting device of an autonomous broadcasting system.
Figure 10:
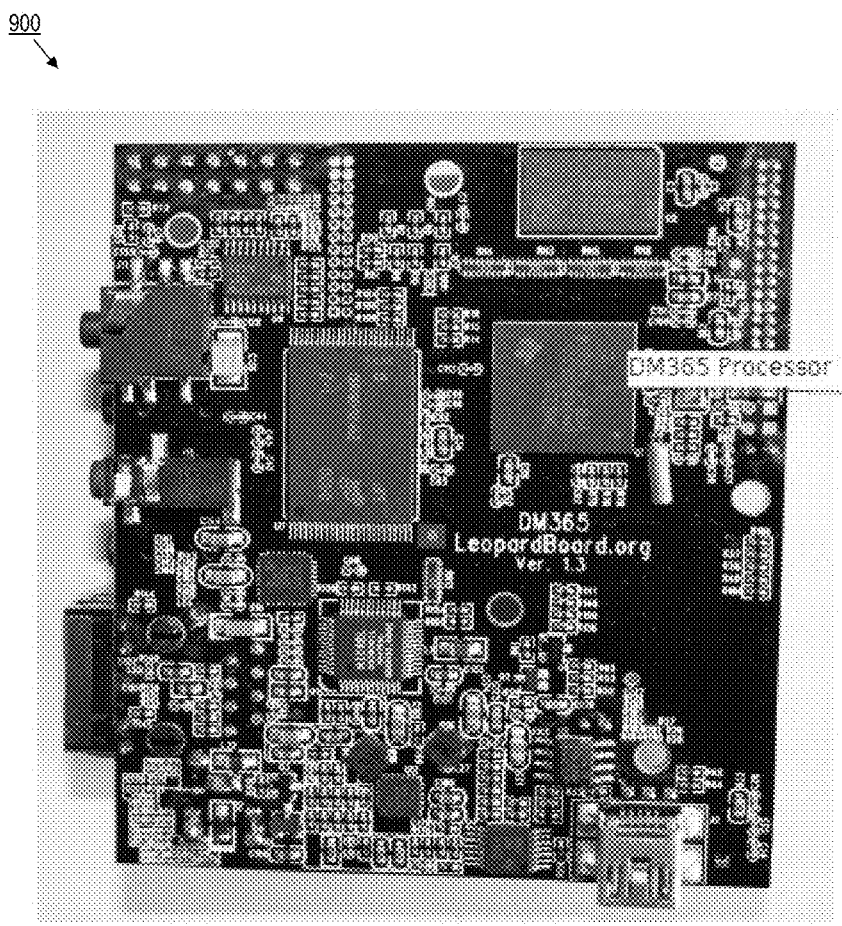
FIG. 10 is a side elevational view of the opposite side of the processor board of FIG. 9 with a main processor thereof labeled.
Figure 11:
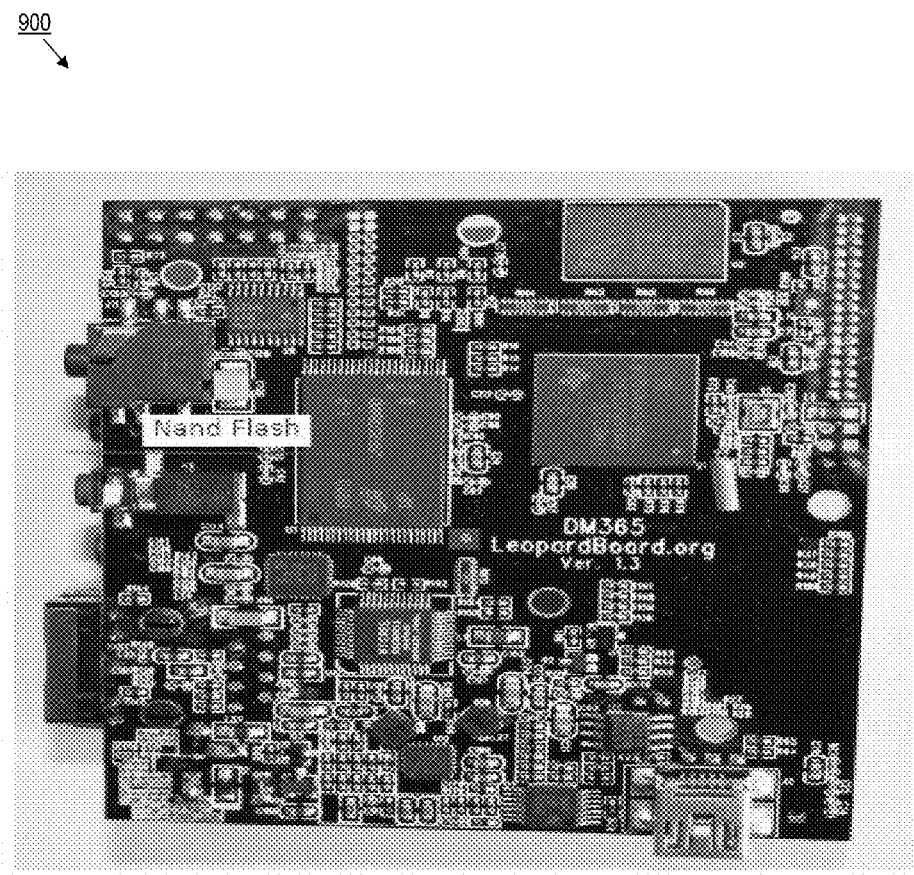
FIG. 11 is a side elevational view of the processor board of FIG. 10 with a first memory thereof labeled.
Figure 12:
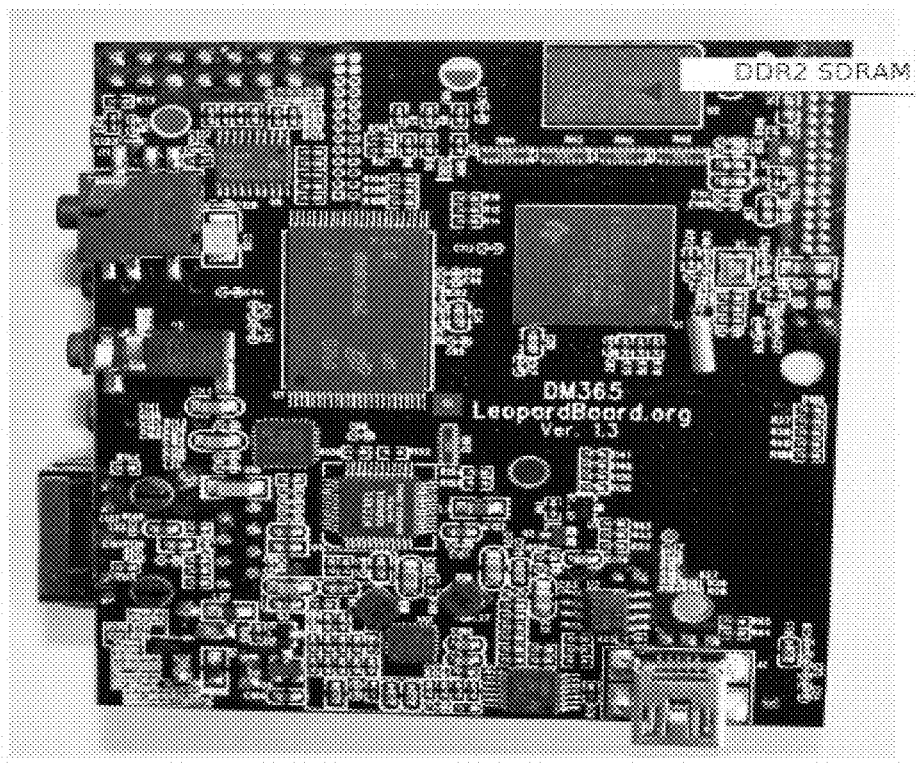
FIG. 12 is a side elevational view of the processor board of FIG. 10 with a second memory thereof labeled.
Figure 13:
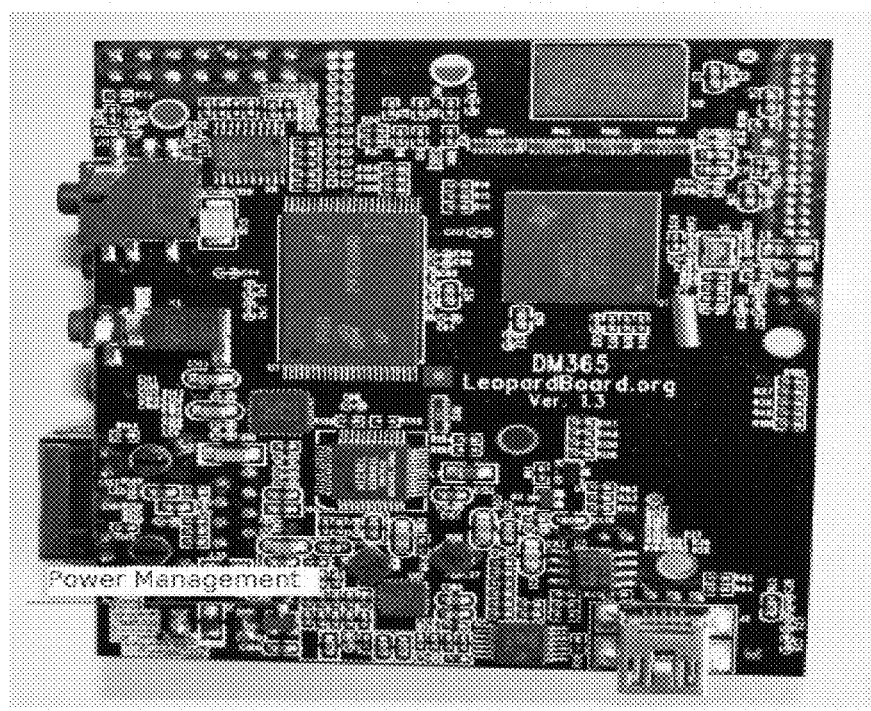
FIG. 13 is a side elevational view of the processor board of FIG. 10 with a power management chip thereof labeled.
Figure 14:
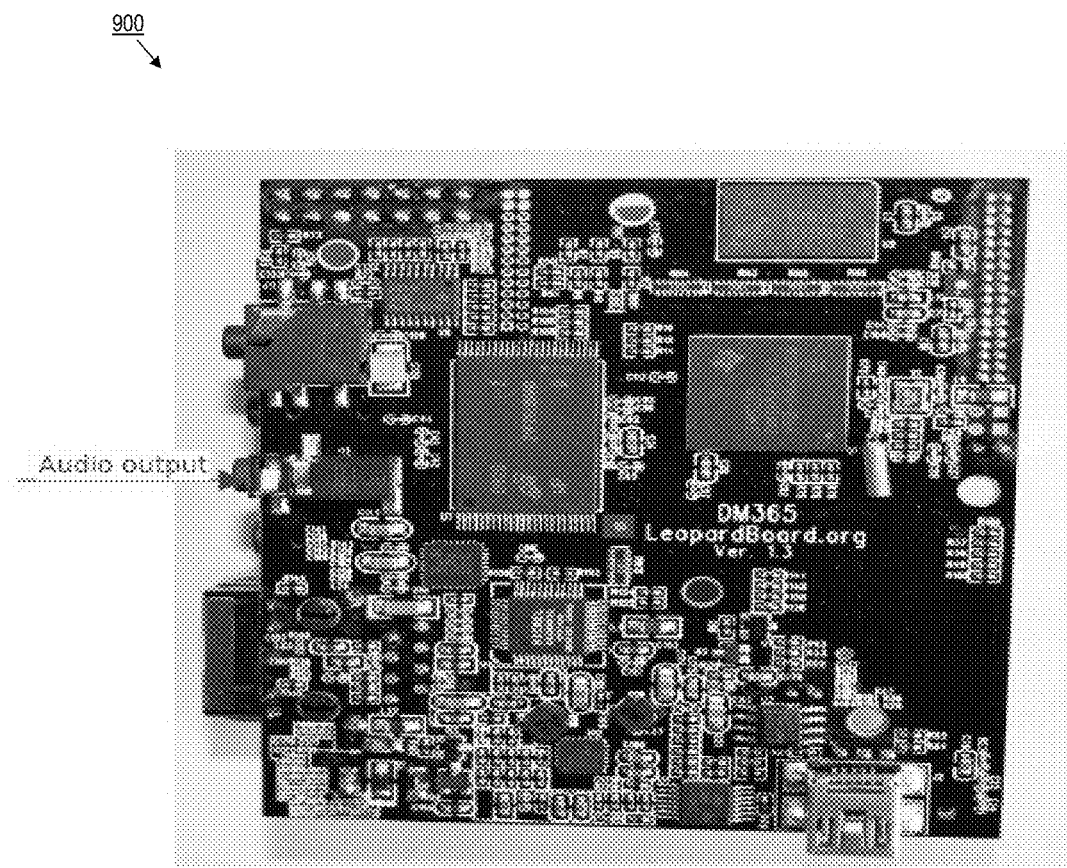
FIG. 14 is a side elevational view of the processor board of FIG. 10 with an audio output jack thereof labeled.

Accordingly, as shown in FIG. 8, the scheduling logic 220 includes four access points labeled as data flows or connections 1, 2, 3, and 5. A first access point (connection 1) is a website (and web-service API) for content providers 216 to manage their respective events. A second access point (connection 2) is a web-service API for broadcasting devices 208 to coordinate with the event schedule and open up channels for broadcasting. A third access point (connection 3) is a protocol for managing the media servers 212 and monitoring their usage. A fourth access point (connection 5) is a web interface for viewers 218 to request access to live or pre-recorded video streams.

In the autonomous broadcasting system 200, each broadcasting device 208 is an embedded device which can capture a video feed from a local source (e.g., a digital camera), encode that feed and stream it to media servers 212 provided by the media server cloud 222. The broadcasting device 208 interacts with the scheduling logic 220 in order to synchronize its event schedule, coordinate a live broadcast and later to upload a higher quality (e.g., any one or any two or more of the following: higher video resolution, lower video compression loss; increased audio quality, larger size, and/or increased frame rate) version of captured video to the media server cloud 222.

The primary responsibilities of the broadcasting devices 208 are to: (1) capture and encode a video feed for a scheduled event; (2) publish its video stream to a designated streaming server; and (3) manage any hardware that is needed for capturing the local video feed. Other responsibilities of the broadcasting devices 208 may include any one or any two or more of the following: automatically registering itself with the scheduling logic 220, uploading an improved quality (e.g., any one or any two or more of the following: higher video resolution, lower video compression loss; increased audio quality, larger size, and/or increased frame rate) version of the video data to the media server cloud 222; and providing a preview of the video at the broadcasting device 208, for example, using an external display (e.g., monitor) connected via a video output (e.g., VGA connector) of the broadcasting device 208 or using a display (e.g., LCD screen) integrated with the broadcasting device. Additionally, any one or any two or more of these other responsibilities could be implemented using a separate device.

The media server cloud 222 includes at least two types of resources: (1) streaming servers and (2) storage servers. A streaming server is able to stream a live or pre-recorded video to a viewer 218 from a broadcasting device's live stream, from another streaming server, or from a storage server. Instances of the media servers 212 can be dynamically created, deleted and configured at the discretion of the scheduling logic 220. The streaming servers are acquired as discrete server instances from a third-party cloud computing service (e.g., Amazon EC2). The storage servers are acquired as discrete data buckets from a third-party cloud storage service (e.g., Amazon S3).

The primary responsibilities of the media server cloud 222 are to: (1) make the video streams from the broadcasting devices 208 available to many individual viewers 218 on various types of viewing devices (e.g., televisions, personal computers, cell phones); (2) maintain secure access to live and pre-recorded video streams; (3) record live broadcasts onto a storage server; and (4) facilitate the uploading of higher quality (e.g., any one or any two or more of the following: higher video resolution, lower video compression loss; increased audio quality, larger size, and/or increased frame rate) broadcast recordings from the broadcasting devices 208 to storage servers. Other responsibilities of the media server cloud 222 may include any one or any two or more of the following: running initialization and shutdown scripts, running channel configuration and deletion scripts for each live broadcast, logging usage statistics (e.g., number of open viewer sessions, bandwidth usage, viewer IP addresses) back to the scheduling logic 220, and enforcing single-token security for preventing a ticketed viewer from opening two or more simultaneous views of the event. Additionally, any one or any two or more of these other responsibilities could be implemented separately.

The streaming servers are configured to serve five primary functions: (1) receive an originating stream from a broadcasting device 208 for recording and re-streaming (Origin); (2) relay a stream from one streaming server to another (Relay); (3) send a stream to an end-client for viewing (Edge); (4) send a recorded stream file from a storage server to an end-client for viewing as video-on-demand (VOD); and (5) receive a high-quality (e.g., any one or any two or more of the following: higher video resolution, lower video compression loss; increased audio quality, larger size, and/or increased frame rate) recording from a broadcasting device 208 and store it on a storage server (e.g., via a trickle upload process). Other responsibilities of the streaming servers may include any one or any two or more of the following: logging viewer usage information with the scheduling logic such as how long each viewer watched the video (e.g., for billing purposes), the IP address for each viewer (e.g., for geographical analysis of viewer base), and how much raw video data was used (e.g., for accounting purposes), converting the video, splicing and cropping the video, and filtering and excerpting the video (e.g., based on features of interest such as motion, facial recognition). Additionally, any one or any two or more of these other responsibilities could be implemented separately.

The storage servers have a single primary function, which is to maintain recorded stream-files for later viewing on-demand by viewers 218. Other responsibilities of the storage servers may include any one or any two or more of the following: performing authentication prior to granting access to stored video files, logging access to stored video files, providing an interface for managing stored video files (e.g., uploading, downloading, making available to third parties such as DVD manufacturers).

Additionally, any one or any two or more of these other responsibilities could be implemented separately.

The interactions between the content provider 216 and the scheduling logic 220 are depicted in FIG. 8 as data flow or connection 1, labeled "event management." This is the primary interaction that the content provider 216 has with the scheduling logic 220.

In one exemplary embodiment, the content provider 216 manages events through a web site interface. The website interface allows the content provider 216 to securely log in to the website associated with the scheduling logic 220 and see a list of broadcasting devices 208 belonging to or otherwise associated with the content provider 216, as well as any past, current, or future events that are scheduled to broadcast from those devices. Each event is defined by the broadcasting device 208 it streams from, a name assigned to it by the content provider 216, a start date/time and the duration of the broadcast (or an end date/time). Each event also has parameters for the licensing type that will be used for the content.

When a content provider 216 receives a new broadcasting device 208, the content provider 216 must register that broadcasting device 208 before broadcasting from it. The registration process is designed to be extremely simple. The content provider 216 is assumed to already have an account on the website implemented by the scheduling logic 220. This account may have been setup at the time that the broadcasting device 208 hardware was purchased.

Figure 15A:
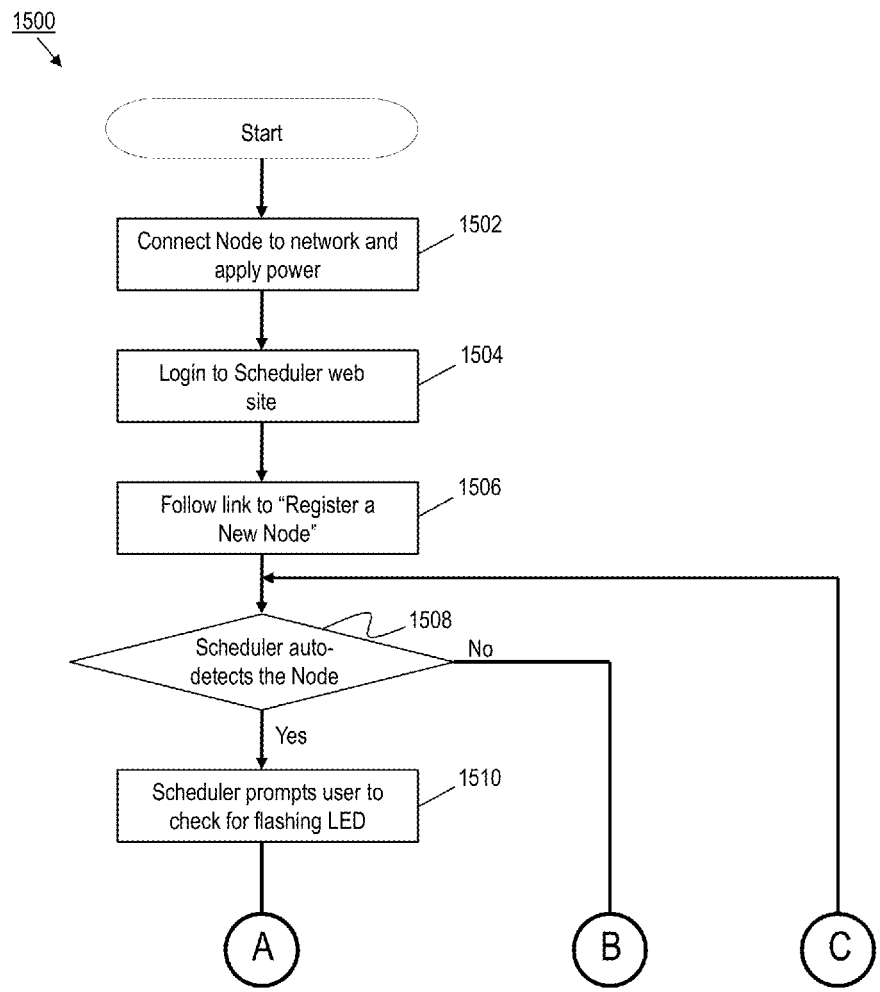
FIGS. 15A and 15B form a flow chart directed to a registration process, according to one exemplary embodiment, for registering a broadcasting device within an autonomous broadcasting system.
Figure 15B:
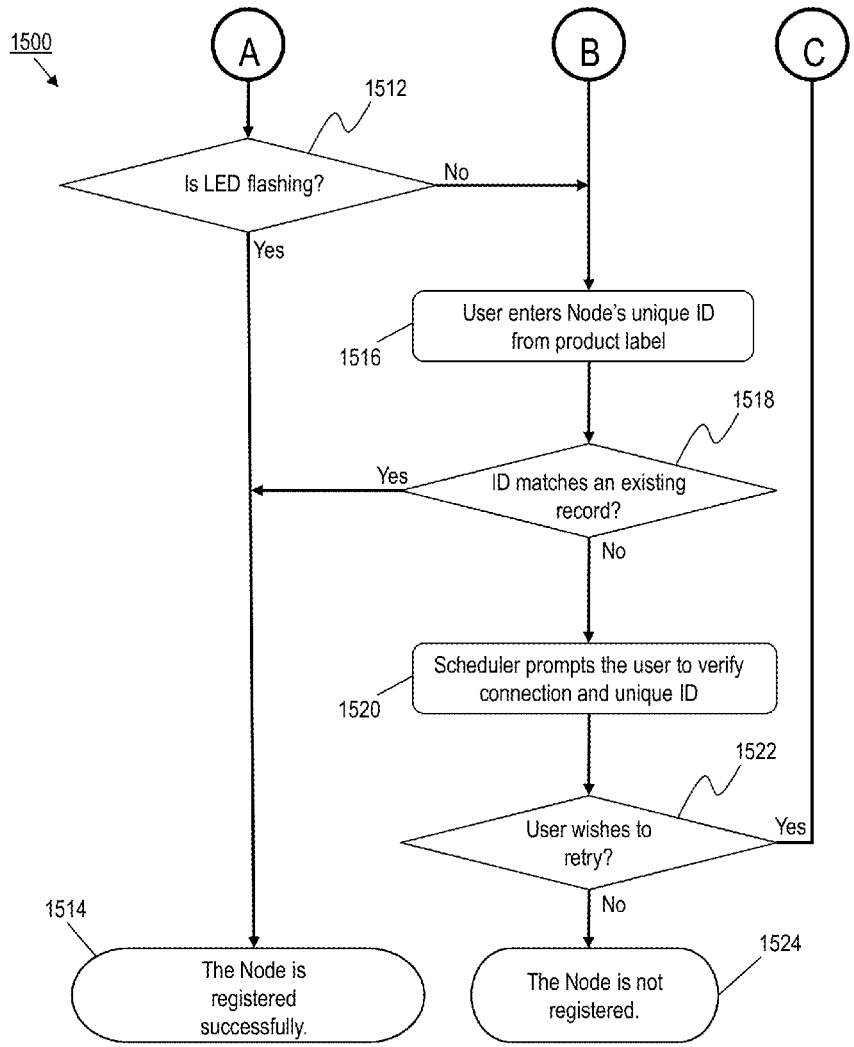

From the perspective of the content provider 216, a registration process 1500 for registering the new broadcasting device 208, according to one exemplary embodiment, is shown in FIGS. 15A and 15B.

In step 1502, the broadcasting device 208 is connected to the network 214. For example, the broadcasting device 208 is plugged into an active Internet connection using an Ethernet port on the broadcasting device 208 via a physical link such as a cable. As another example, the broadcasting device 208 is brought into range of an open wireless network, e.g., a WiFi connection, if the broadcasting device 208 supports WiFi. If the wireless network includes security preventing a ready connection (e.g., a WEP code), the broadcasting device 208 can be commissioned using the physical link to the Internet and, after registration, the security wireless network code(s) (e.g., a router WEP code) can be transmitted to the broadcasting device 208 via the physical link, after which the broadcasting device 208 can be disconnected from the physical link and connected to the Internet via the wireless network. Also in step 1502, power is applied to the broadcasting device, for example, by plugging in a power cord of the broadcasting device 208.

In step 1504, the content provider 216 uses a computer (e.g., computer 100) to navigate to the website of the scheduling logic 220. Then, the content provider 216 logs into his account.

In step 1506, the content provider 216 is provided with an indication (e.g., via a pop-up message or a flash message) on the website indicating that an unregistered broadcasting device from a recognized WAN IP address has been detected. In particular, in step 1508, the scheduling logic 220 determines if it is able to auto-detect the broadcasting device 208.

If the scheduling logic 220 is able to auto-detect the broadcasting device 208, the website will prompt the content provider 216, in step 1510, to check whether a light (e.g., LED) on a case of the broadcasting device 208 is flashing. The broadcasting device 208 can have any number of status indicators including visual status indicators (e.g., LEDs) and/or audio status indicators (e.g., speakers). These status indicators can be used to provide a visual and/or audible indication of various conditions relating to the broadcasting device 208 and/or the system in which it is deployed. In one exemplary embodiment, the visual status indicators include one or more of a power indicator, a network connection indicator, an online indicator (which indicates, for example, that the broadcasting device 208 can reach the scheduler website), a WiFi indicator, and a battery charge level indicator.

The broadcasting device 208 can also have means or structure for facilitating control of all or part of the streaming operation. For example, the broadcasting device 208 can include means for allowing an on-site operator to start, pause, and resume the streaming operation at their own discretion. The means can include any structure supporting input from the operator, such as a button, switch, or the like. In one exemplary embodiment, an administrator can toggle this functionality on and off.

In step 1512, the content provider determines if the light is flashing. If the content provider 216 sees the flashing light, he selects YES to confirm the flashing light and the broadcasting device 208 is successfully registered in step 1514. The registration process 1500 then ends (i.e., the remaining steps are skipped).

If the content provider 216 does not see the flashing light, he selects NO to indicate the light is not flashing. In response to the content provider 216 indicating that the light is not flashing (or the scheduling logic 220 being unable to auto-detect the broadcasting device 208 in step 1508), the scheduling logic 220 prompts the content provider 216 to manually register the broadcasting device 208. Manual registration requires that the content provider 216 find an identifier on the bottom of the case of the broadcasting device 208 and enter it via the website. This identifier can be any numeric data, alphanumeric data, or other code that uniquely identifies the broadcasting device. In one exemplary embodiment, the identifier is or is based on the die ID of the processor of the broadcasting device 208. In one exemplary embodiment, the identifier is one of a plurality of non-consecutive serial numbers. In one exemplary embodiment, at least a portion of the identifier is randomly generated. After the content provider 216 finds the identifier on the case, he enters it via the website in step 1516.

The identifier must be entered by the content provider 216 so that the scheduling logic 220 knows which broadcasting device 208 is being registered, since the scheduling logic 220 was unable to auto-detect the broadcasting device 208. The scheduling logic 220 maintains records (e.g., a list) of unregistered broadcasting devices 208 from a commissioning process, as described below. In step 1518, the scheduling logic 220 compares the identifier input by the content provider 216 to a record including data previously associated with the particular broadcasting device 218. In one exemplary embodiment, the record is created by the manufacturer interfacing with the website of the scheduling logic 220 after the broadcasting device is manufactured. The comparison in step 1518 insures that only expected broadcasting devices are registered with the scheduling logic 220, thereby reducing if not eliminating the possibility that unauthorized broadcasting devices will be introduced into the system. Thus, the unique identifier allows the scheduling logic 220 to identify the broadcasting device 208.

As described below, the unique identifier is also used in communications with the scheduling logic 220 by the broadcasting device 208 to communicate its identity, which is authenticated using the shared credentials that were established during the commissioning process.

If the scheduling logic 220 is able to find a record with data matching the identifier of the broadcasting device 208, then the broadcasting device 208 is successfully registered in step 1514. The registration process 1500 then ends (i.e., the remaining steps are skipped).

If the scheduling logic 220 does not find a record with data matching the identifier input by the content provider 216, the scheduling logic 220 prompts the content provider 216, in step 1520, to double-check that the broadcasting device 208 has power, the broadcasting device 208 is properly connected to the Internet, and the content provider 216 entered the identifier correctly.

If the content provider 216 finds one of these problems, he corrects it and clicks "Retry," in step 1522, which causes the registration process 1500 to return to the auto-detection stage (i.e., step 1508). Alternatively, if the content provider 216 does not find one of these problems or otherwise wishes to abort the registration process 1500, he can choose to not select "Retry," in step 1522. Thereafter, the broadcasting device 208 remains unregistered in step 1524. The content provider 216 can then elect to call a provided support number for further troubleshooting or assistance.

The registration process 1500 for registering a broadcasting device 208, as shown in FIGS. 15A and 15B, can also be viewed from the perspective of the broadcasting device 208. As noted above, the registration process 1500 is a process by which the broadcasting device 208 becomes associated with a particular content provider 216.

Figure 16A:
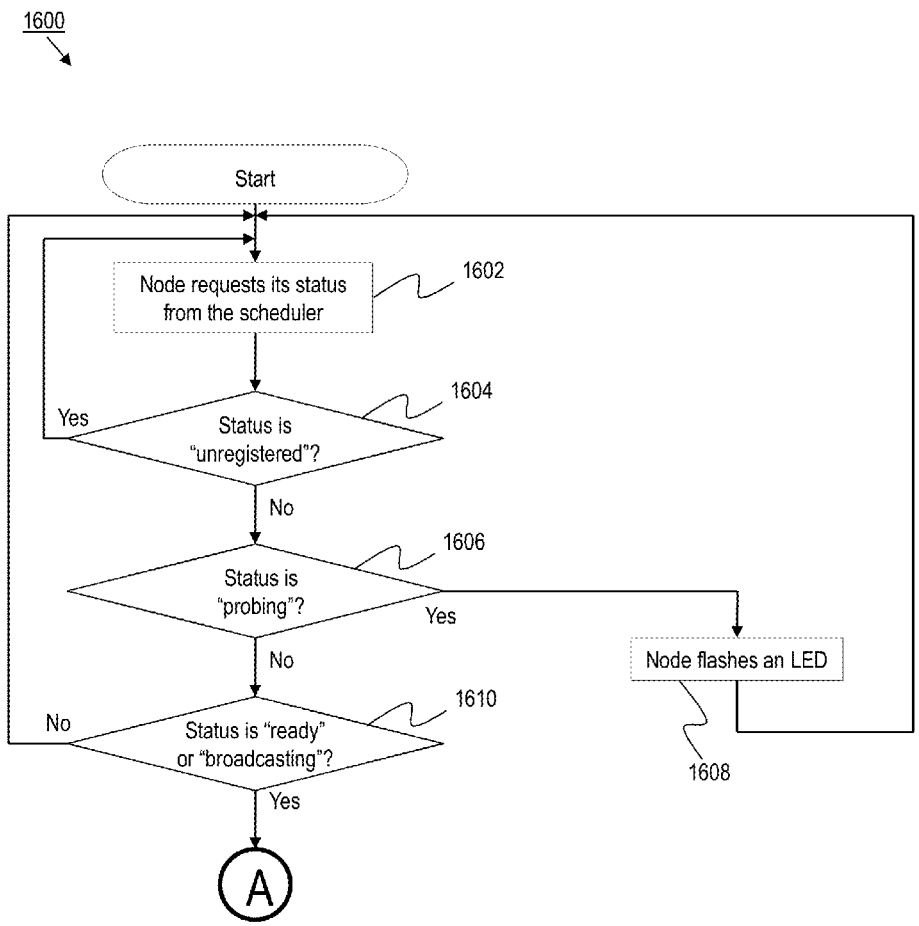
FIGS. 16A and 16B form a flow chart directed to a combined process of registering a broadcasting device and performing post-registration processing (e.g., broadcasting) using the broadcasting device, according to one exemplary embodiment.
Figure 16B:
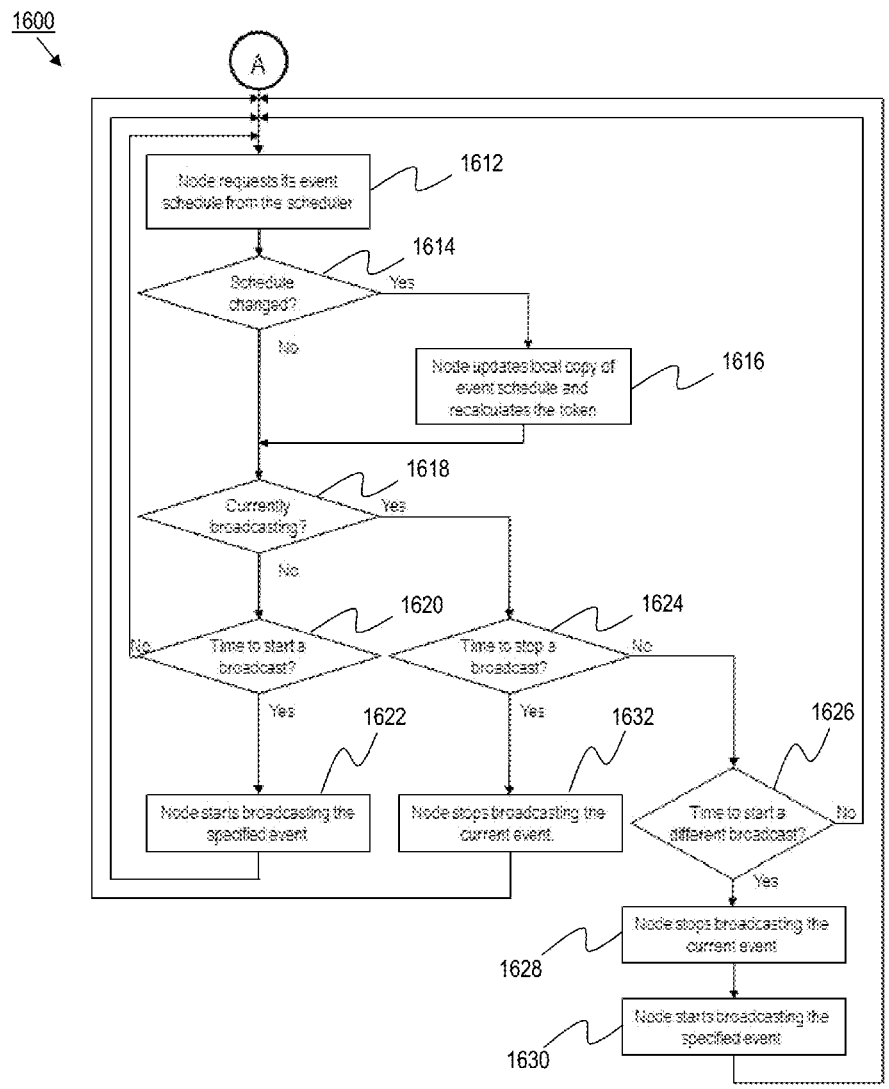
Figure 17A:
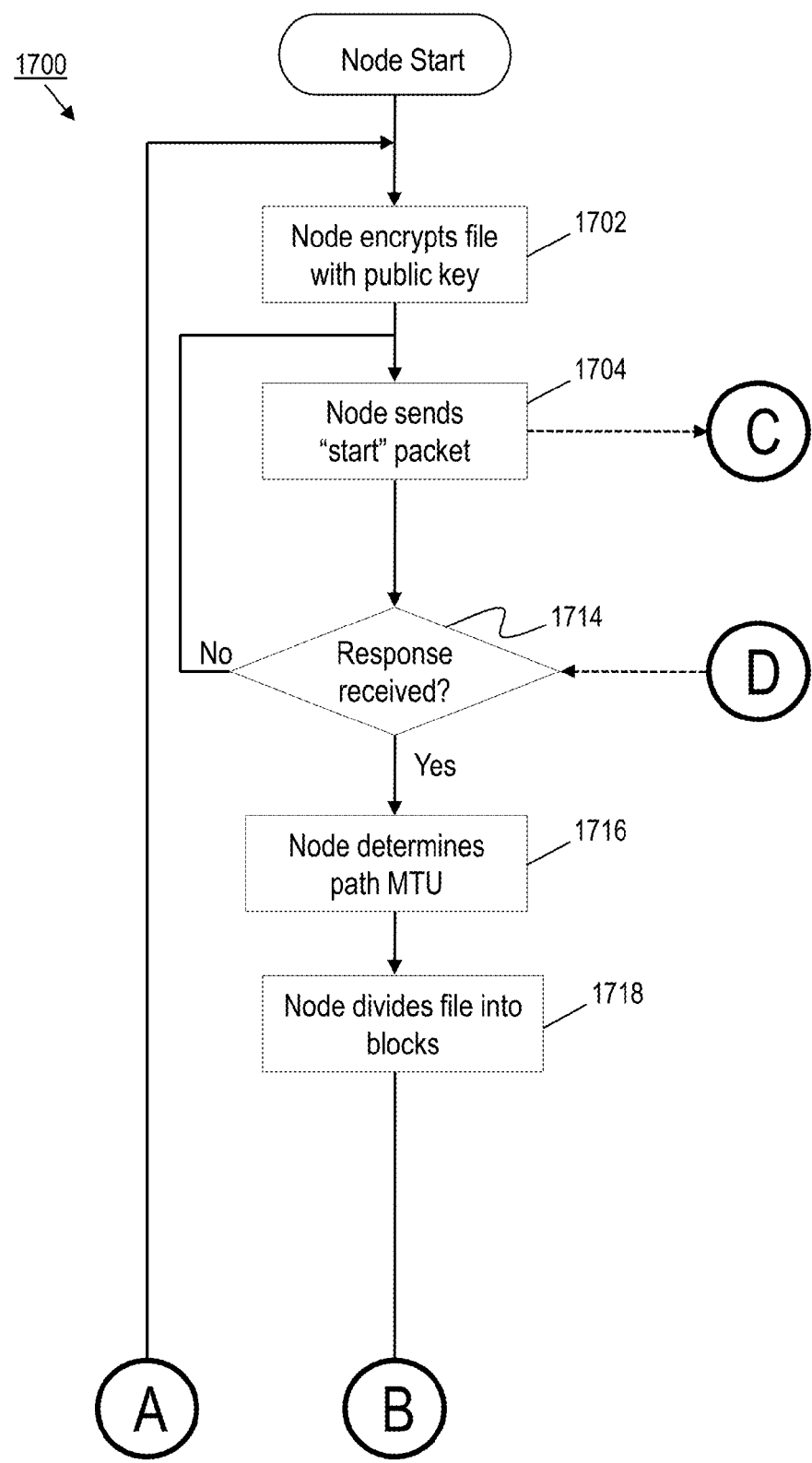
FIGS. 17A, 17B, 17C, 17D, 17E, and 17F form a flow chart directed to an upload process, according to one exemplary embodiment, for uploading higher quality data from a broadcasting device to a media server.
Figure 17B:
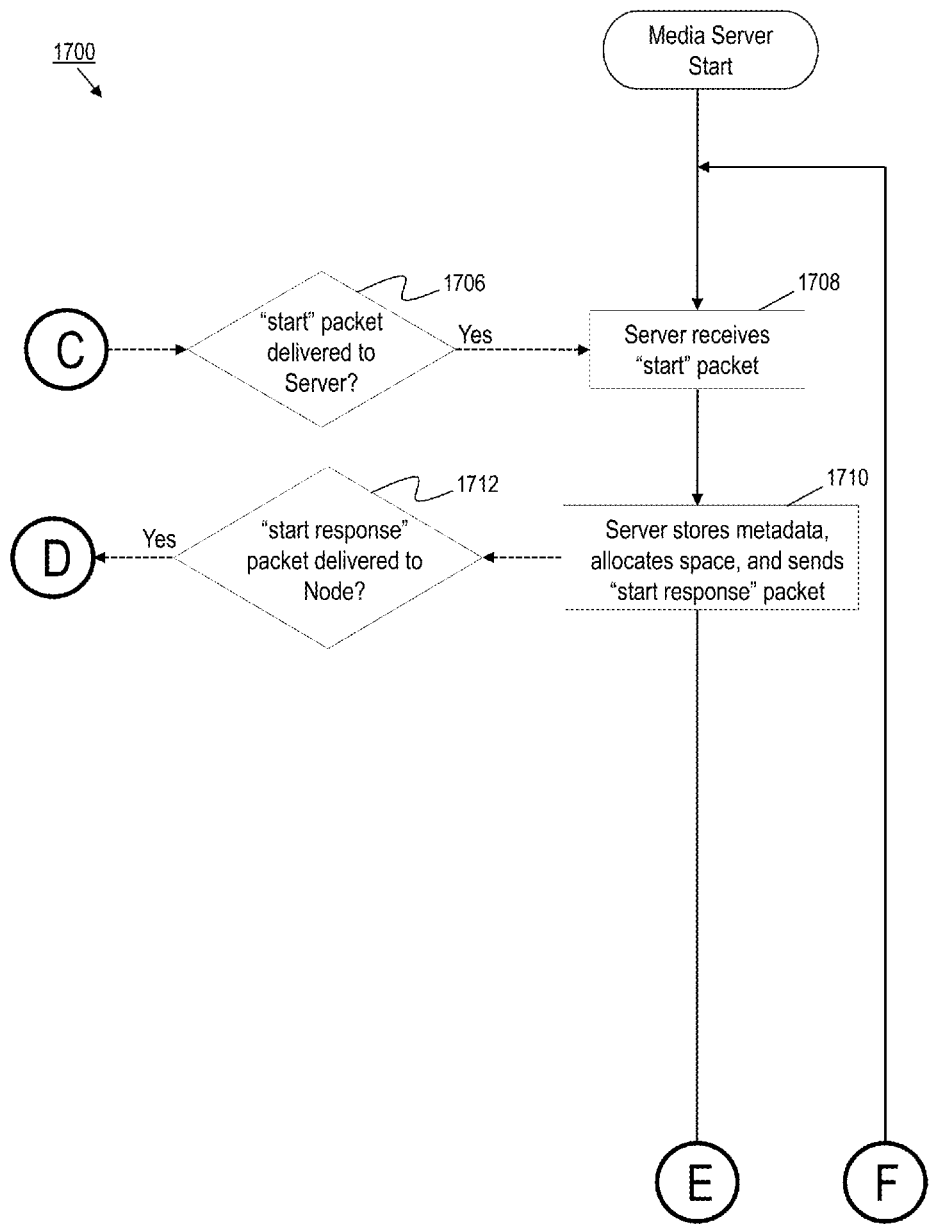
Figure 17C:
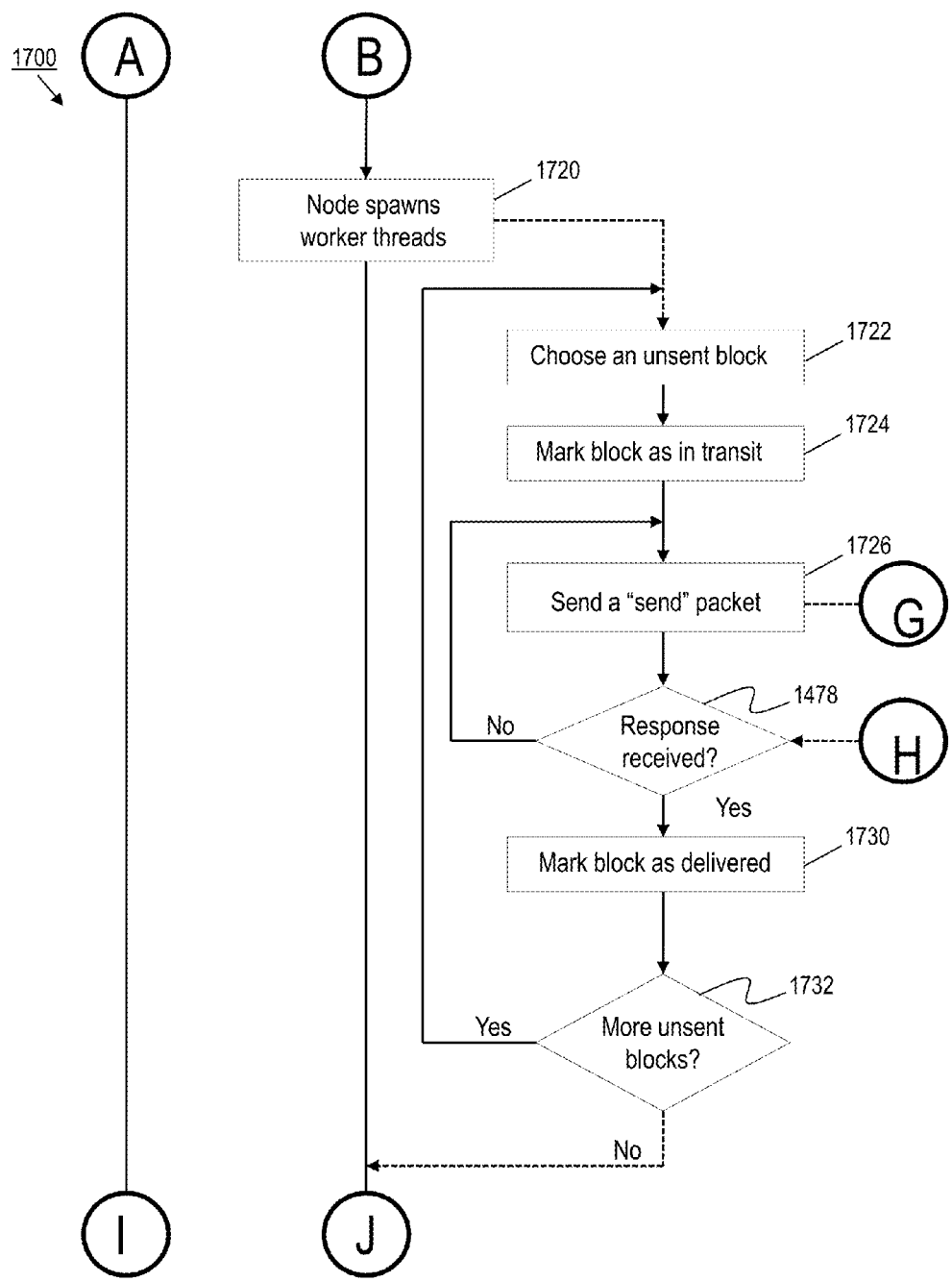
Figure 17D:
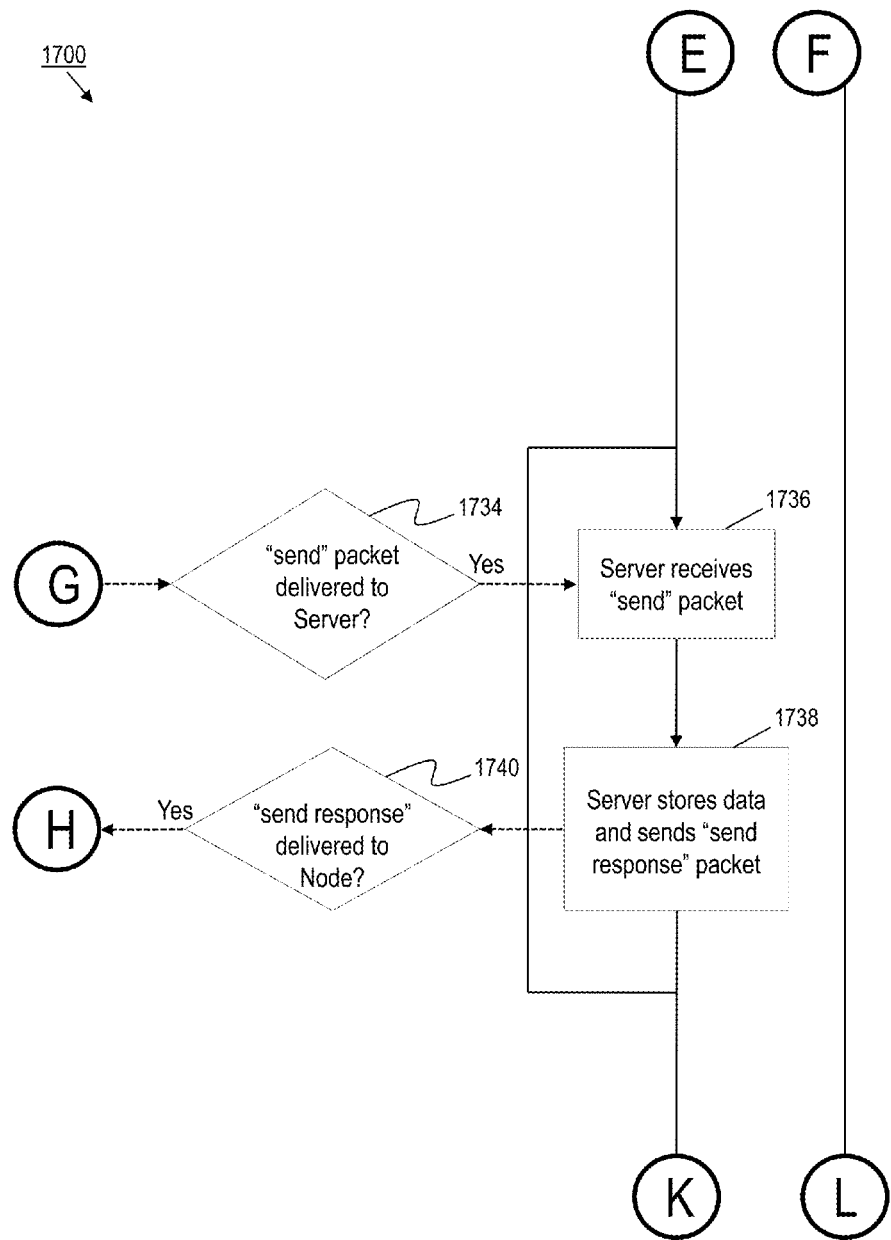
Figure 17E:
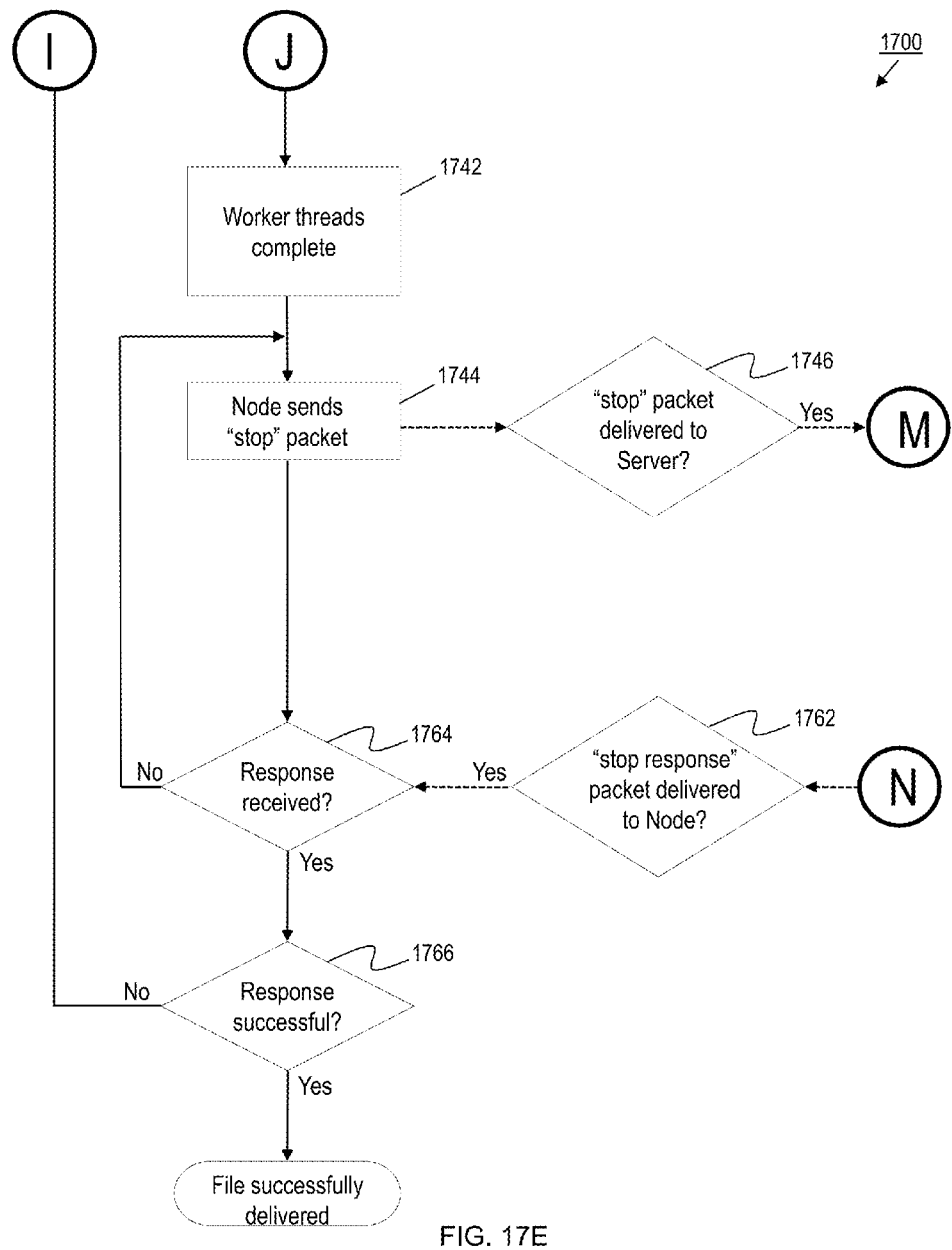
Figure 17F:
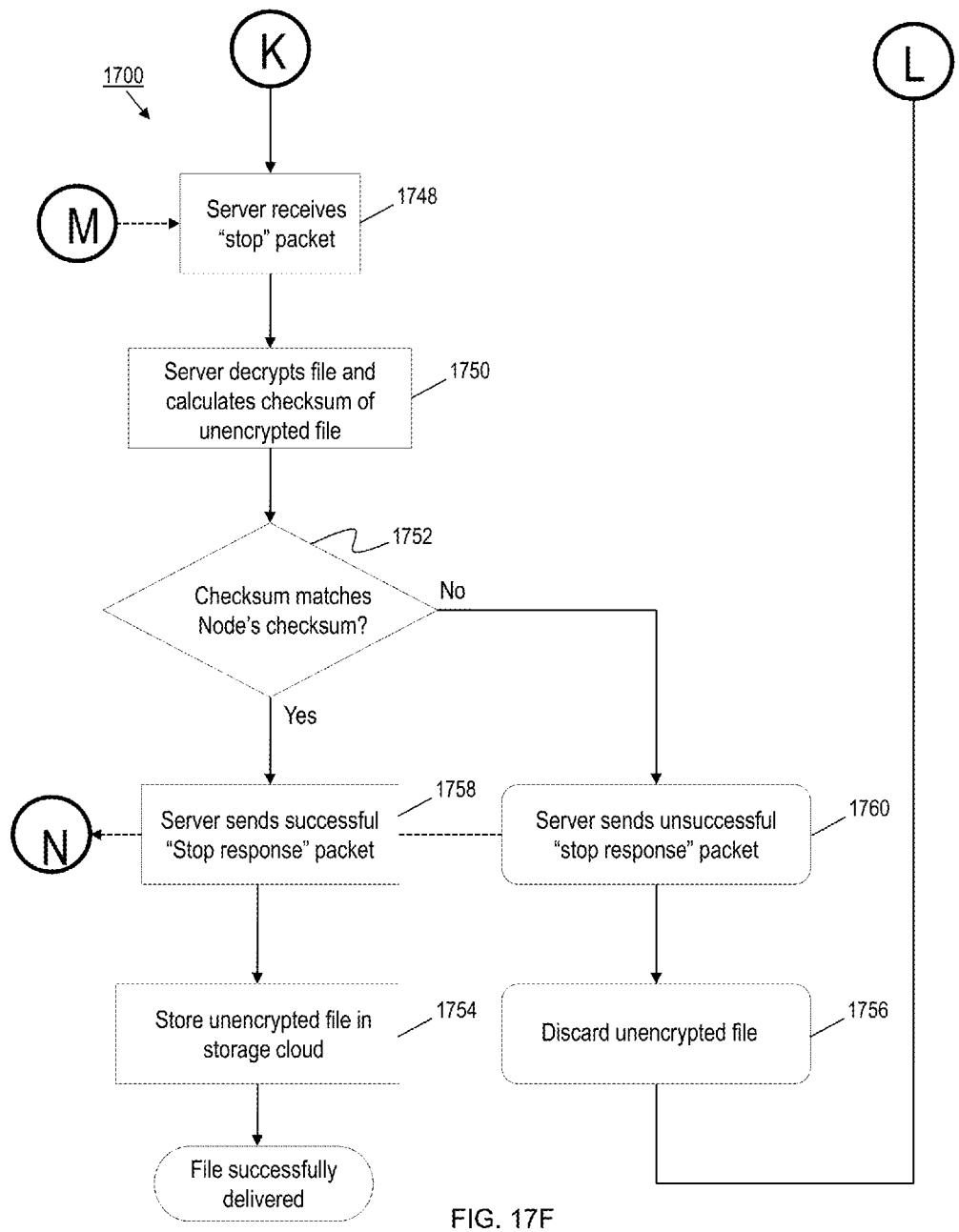

Upon powering up (step 1502), the broadcasting device 208 sends a "status request" (e.g., an HTTP GET request) to the scheduling logic 220 (see FIGS. 16A and 16B). For additional security. any of the communications between the broadcasting device 208 and the scheduling logic 220 might be done using Secure Hypertext Transfer Protocol (HTTPS). The broadcasting device 208 is authenticated using its unique identifier (described above) and secret password (described below). In one exemplary embodiment, each "status request" is sent through a RESTful web-service API. The status request can take the form of GET/nodes/[NODE-ID].xml and return an XML packet which minimally includes, for example, <node><status>unregistered</status></node>. The status request is used to send the unique identifier of the broadcasting device 208 to the scheduling logic 220. The status request also allows the broadcasting device 208 to request the current status that the scheduling logic 220 has for itself. For example, the status could be "unregistered," in which case the broadcasting device 208 would do nothing but keep checking in with the scheduling logic 220; "probing," in which case the broadcasting device 208 would know that someone is trying to register it, so the broadcasting device 208 would flash its LED; or "ready" or "broadcasting," in which case the broadcasting device 208 is registered and can proceed to broadcast video (see FIGS. 16A and 16B).

A combined process 1600 for registering the broadcasting device 208 and performing post-registration processing (e.g., broadcasting) using the broadcasting device 208, according to one exemplary embodiment, is shown in FIGS. 16A and 16B. Steps 1602, 1604, 1606, 1608, and 1610 relate to the autonomous registration of the broadcasting device 208 with the scheduling logic 220. Steps 1612, 1614, 1616, 1618, 1620, 1622, 1624, 1626, 1628, 1630, and 1632 are all directed to post-registration processing by the broadcasting device 208. In particular, steps 1612, 1614, 1616, 1618, and 1620 form a processing loop wherein the broadcasting device 208 periodically checks with the scheduling logic 220 to determine if an event schedule stored on the broadcasting device 208 is stale (i.e., no longer matches the event schedule stored at the scheduling logic 220). If so, the broadcasting device 208 updates the local copy of its event schedule (step 1616). Furthermore, steps 1618, 1620, 1622, 1624, 1626, 1628, 1630, and 1632 relate to broadcasting of events by the broadcasting device 208.

In addition to being useful during the registration process 1500, the returned status is also useful for synchronizing expected behavior when a connection between the broadcasting device 208 and the scheduling logic 220 is interrupted. For example, the status request could tell the broadcasting device 208 whether or not there is an open broadcast session for that broadcasting device 208. An open broadcasting session means that the scheduling logic 220 believes that the broadcasting device 208 should be streaming video to a specific media server 212 on specific ports. If power was lost at the broadcasting device 208, the scheduling logic 220 will use this information to resume a broadcast when power is restored to the broadcasting device 208.

Since the broadcasting device 208 is not registered, the scheduling logic 220 logs its network address (e.g., WAN IP) and returns a status of "unregistered." The WAN IP refers to the IP address from which traffic appears to originate on the Internet or wide-area network. The broadcasting device 208 waits (e.g., for a few seconds) and then re-checks the status of the broadcasting device 208.

If the content provider 216 is logged into the website of the scheduling logic 220 (step 1504) and follows the hyperlink labeled "Register a New Node" (step 1506), then the scheduling logic 220 compares the WAN IP address of the content provider 216 with the last know WAN IP address of its unregistered broadcasting devices.

If the scheduling logic 220 finds a unique match (i.e., finds exactly one of its unregistered broadcasting devices with the same last known WAN IP address as the content provider 216), then the scheduling logic 220 changes that status of the broadcasting device 208 to "probing." Otherwise, the scheduling logic 220 prompts the content provider 216 to enter the unique code from the bottom of the case of the broadcasting device 208 (step 1516).

When the broadcasting device 208 sees a status of "probing," the broadcasting device 208 begins flashing its light (e.g., LED). The broadcasting device 208 waits (e.g., for a few seconds) and then re-checks the status of the broadcasting device 208 by sending another "status request." In this manner, prior to being registered, the broadcasting device 208 continues to query the scheduling logic 220 until it discovers that it is registered (e.g., "ready," "broadcasting").

If the content provider 216 is eventually successful in registering the broadcasting device 208, the scheduling logic 220 will set the broadcasting device's status to "ready." The registration process 1500 then ends (i.e., the remaining steps are skipped). Once the broadcasting device 208 is registered, it enters its normal life cycle and can stream video in accordance with its user-defined schedule.

If, however, the content provider 216 elects to give up on the registration process 1500, or the registration process 1500 otherwise fails, the scheduling logic 220 will set the status of the broadcasting device 208 to "unregistered." Thereafter, as noted above, since the broadcasting device 208 is not registered, the scheduling logic 220 logs its WAN IP address and returns a status of "unregistered," and the registration process 1200 can continue from this point. In the embodiment described herein, an unregistered broadcasting device cannot be used for anything with respect to the scheduling logic or the media servers, since it is not associated with a user account. No events can be scheduled for the unregistered broadcasting device and no video can be streamed through it. The purpose of the registration process 1200 is to tie the broadcasting device 208 to a specific account. After registration, a user (e.g., the content provider 216) can schedule events for the broadcasting device 208 and broadcast from it.

The broadcasting device 208 is fully automated and interacts with the scheduling logic 220 through a web-server API in order to auto-register itself, to coordinate its schedule, to initiate event broadcasting and to coordinate the uploading of high-quality (e.g., any one or any two or more of the following: higher video resolution, lower video compression loss; increased audio quality, larger size, and/or increased frame rate) video. Prior to shipping each broadcasting device 208, a secret password is installed on the broadcasting device 208 via a commissioning process and the scheduling logic 220 receives a record for that broadcasting device 208 with its secret password. This secret password can be any numeric data, alphanumeric data, or other code for use in authenticating the broadcasting device 208 with respect to the scheduling logic 220. By sharing the secret password, the broadcasting device 208 can be securely authenticated (using its unique identifier and secret password) by the scheduling logic 220 using HTTP authentication over an SSL connection.

A commissioning process is a process by which software is loaded onto the broadcasting hardware to form the broadcasting device 208. During the commissioning process, a user name and a secret password are assigned to the broadcasting device 208 and shared with the scheduling logic 220. In one exemplary embodiment, the username is the unique identifier described above. The commissioning process typically occurs at a manufacturing site of the broadcasting device 208. The software is loaded onto the broadcasting hardware using any suitable means, method, and/or mechanism. In one exemplary embodiment, described below, the software is loaded onto the broadcasting hardware using a bootable mini-SD card. The manufacturer has a special account (i.e., a manufacturer account) on the website of the scheduling logic 220.

A commissioning process, according to one exemplary embodiment, includes the following six steps:

Step 1. A bootable mini-SD card is inserted into or otherwise interfaced with (e.g., via a USB-based card interface communicating via a USB port of) the broadcasting device 208. The bootable mini-SD card contains a software image that will be installed on the broadcasting device 208.

Step 2. The broadcasting device 208 is turned on, which results in the broadcasting device 208 booting from the mini-SD card.

Step 3. A boot program on the mini-SD establishes a network connection (e.g., a wired or wireless Internet connection) and contacts the website of the scheduling logic 220 over an SSL connection using the manufacturer's account information or other credentials (found on the boot image). The scheduling logic 220 authenticates the manufacturer and also verifies its IP address.

Step 4. The boot program makes a commissioning request to the scheduling logic 220 passing in the broadcasting device's ID as the broadcasting device name.

Step 5. The scheduling logic 220 responds with an auto-generated password that is stored on a flash disk of the broadcasting device 208 as well as at the scheduling logic 220.

Step 6. The boot program writes the software (i.e., the management software) to the flash disk of the broadcasting device 208, which concludes the commissioning process.

In one exemplary embodiment, a testing device (e.g., the computer 100) can be used to verify that the software was correctly installed on the broadcasting hardware during the commissioning process and is functioning properly. This testing device, or another device, could be used to print a label including the unique identifier for the broadcasting device 208, wherein the label is affixed to a housing or case of the broadcasting device 208.

Each broadcasting device 208 keeps a local copy of its schedule of events, but makes frequent requests to the scheduling logic 220 to check for changes to its schedule. In particular, the broadcasting device 208 sends an "event schedule request" (e.g., an HTTP GET request) to the scheduling logic 220, using its unique identifier and secret password for authentication. In this manner, the broadcasting device 208 obtains a copy of its event schedule maintained by the scheduling logic 220. In one exemplary embodiment, the response from the scheduling logic 220 that includes the event schedule is formatted in XML.

In one exemplary embodiment, the broadcasting device 208 sends an "event schedule request" to the scheduling logic 220 approximately every 5 seconds. In one exemplary embodiment, the broadcasting device 208 sends an "event schedule request" to the scheduling logic 220 every 30 to 60 seconds. In one exemplary embodiment, a delay of more than 60 seconds is present between successive "event schedule requests" sent by the broadcasting device 208 to the scheduling logic 220 no more frequent than every 60 seconds.

For each event in the event schedule, the web service returns a unique identifier, a start date, a start time, and a duration. Additionally, each event entry in the event schedule includes an "updated-at" timestamp. The broadcasting device 208 stores (e.g., caches) this event schedule locally and uses it to determine when to begin and end each broadcasting session. In one exemplary embodiment, a token made by hashing event updated-at timestamps is used to minimize traffic (i.e., the event schedule requests) with the scheduling logic. At the scheduling logic 220, the token is recalculated whenever the schedule changes. At the broadcasting device 208, the token is recalculated whenever an updated schedule is downloaded from the scheduling logic 220. A difference between the tokens indicates that a change in the schedule maintained as the scheduling logic 200. Thus, if the tokens match, an HTTP status code indicating that there are no changes to the schedule is returned to the broadcasting device by the scheduling logic 220. If the tokens do not match, XML content containing the updated schedule is returned to the broadcasting device 208 by the scheduling logic 220. In this manner, the "event schedule request" is sent by the broadcasting device 208 with its token, and the scheduling logic 220 compares the token from the broadcasting device 208 to its own token, only returning the full schedule if the tokens are different.

When one of the events on the schedule of the broadcasting device 208 is scheduled to begin, the broadcasting device 208 powers up the video acquisition device 210 and any other related devices, early enough in advance for them to go through their respective power-up processes, and sends a "channel creation request" to the scheduling logic 220. This request contains the scheduled event's unique ID and results in the creation of a new broadcasting channel. The broadcasting device 208 then polls this channel by issuing a "view channel request" to the scheduling logic 220 to determine completion of the channel creation. In particular, the broadcasting device 208 must wait until the returned channel is available. Once the channel is available, the web-service responds with values for the media server name/URL, the stream name, and the video and audio ports to broadcast to. Once these values are obtained, the broadcasting device 208 begins capturing and encoding its video stream. The stream is configured to broadcast to the media servers 212 and ports given in the channel. From an encoder, a configuration file is created in SDP format and this configuration file is sent to the scheduling logic 220 in a "configure channel request." The configure channel request establishes the connection between the broadcasting device 208 and the designated media servers 212. The scheduling logic 220 passes this information on to the correct media servers 212. Thereafter, the broadcasting device 208 begins streaming to the media servers 212 on the correct ports. Once streaming of the video data for the event is complete and a corresponding higher quality (e.g., any one or any two or more of the following: higher video resolution, lower video compression loss; increased audio quality, larger size, and/or increased frame rate) file is saved, the broadcasting device 208 can begin a trickle upload process for the video data, as described below.

When the currently broadcasting event is scheduled to end, the broadcasting device 208 sends a "delete channel request" to the scheduling logic 220 and powers down any related devices (i.e., the video acquisition device 210). This request contains the open channel's unique ID, and results in the destruction (i.e., deletion) of the broadcasting channel. Upon deletion of the channel, the video session is converted into a video recording corresponding to a standardized or proprietary format for playback (e.g., VOD) on a standardized or proprietary player, respectively. The video recording is stored in the media server cloud 222 and is associated with the event for later rebroadcast.

The scheduling logic 220 manages the media server cloud 222 by acquiring, configuring and releasing media servers 212, for example, as streaming server instances from a third-party cloud computing service (e.g., Amazon EC2) as needed. The scheduling logic 220 also monitors the server instances for changes in usage or errors, and manages secure access to the media servers 212.

For each streaming server instance, the scheduling logic 220 maintains a record of both estimated or otherwise reserved bandwidth for the event and actual bandwidth being used by the event. All decisions about scaling the resources of the media server cloud 222 are based on actual and expected fluctuations in bandwidth, which is the limiting performance factor for streaming media. In order to preserve service quality, each streaming server instance is utilized only up to a threshold bandwidth. The threshold bandwidth is set to insure that service quality is good while the actual bandwidth usage remains at or below this level.

New streaming server instances are requested from the third-party cloud computing service whenever there is a need for more bandwidth than can be supported easily by the current streaming servers that are active in the media server cloud 222. This need can be triggered by an event that is scheduled to start soon, or by an increase in the number of view requests for existing live broadcasts and/or pre-recorded broadcasts.

Before a scheduled event begins, the amount of bandwidth required is estimated. The bandwidth estimate is then increased by a scaling factor (e.g., two standard deviations) in order to accommodate the bandwidth needs of the event in the vast majority of cases (i.e., the view bandwidth). The viewer bandwidth is then increased by another scaling factor (e.g., 20%) to accommodate unexpected scaling to other servers. Application of these scaling factors provides a total bandwidth to be reserved for the event (i.e., the reserved bandwidth).

Assuming the reserved bandwidth is not greater than the threshold bandwidth for a single streaming server, then all active streaming servers are checked for available bandwidth. If an available server is found, then this amount of bandwidth is reserved on the available server. Additionally, the available server is then configured to act as an Origin server for the event. If a streaming server with enough available bandwidth is not found, then the scheduling logic 220 acquires a new streaming server instance, configures it, and reserves the requested bandwidth on this new server which becomes the Origin server for the event.

If the reserved bandwidth is greater than the threshold bandwidth for a single streaming server, then the necessary bandwidth is reserved on multiple servers. The scheduling logic 220 first reserves a complete server to act as the Origin server for the event. The scheduling logic 220 then reserves one or more Edge servers to supply all of the needed bandwidth to the viewers 218, with the number of Edge servers being determined by dividing the reserved bandwidth by a server's threshold bandwidth (rounding up to a whole number). If the Origin server can support all of the Edge servers directly, then the Edge servers are configured to pull from the Origin server. The number of Edge servers that can be supported by an Origin server is determined by dividing the threshold bandwidth by the event stream's bandwidth (rounding down to a whole number) and then scaling down further (e.g., 10%) to allow room for unexpected growth. If the Origin server cannot support all of the Edge servers, then a number of Relay servers will be reserved to bridge the gap. This is a simple fanout configuration including as many layers of Relay servers as necessary to support the Edge servers without exceeding the threshold bandwidth on any one server.

During a live event broadcast, the bandwidth being used by viewers 218 is monitored to make sure it stays within the viewer bandwidth range for the event. If a view request arrives that would cause the bandwidth to exceed this limit, then the scheduling logic 220 will attempt to reserve more bandwidth on the same server for the event. If the server has bandwidth available, then it is reserved and the viewer bandwidth limit is adjusted to serve the outstanding view request. If the server does not have available bandwidth, then a new Edge server is reserved which relays from the reserved bandwidth on the Origin server. If the amount of reserved bandwidth is smaller than some limit, then a Relay server is also reserved to stand between the Origin server and the new Edge server. This same mechanism is used with bandwidth usage on the new Relay server, so that the network can readily scale in size and, in theory at least, scale indefinitely.

As far as management of the media server cloud 222 is concerned, video-on-demand (VOD) streaming is treated as an ongoing event. This is true in that the bandwidth usage history for viewing pre-recorded events is tracked and used to estimate future bandwidth needs in the same way that event bandwidth usage is estimated. The VOD pseudo-event then reserves bandwidth in the same way as regular (i.e., live) events, with the exception that all servers can send VOD directly, so there is no need for an Origin/Relay/Edge configuration. As bandwidth increases beyond the threshold bandwidth of a single server, more servers are reserved directly.

After a streaming server is acquired and is running on a disk image that contains streaming server software, additional configuration must be performed. This is done by uploading an initialization package to the server and then running an initialization script of the package. This includes activities such as performance tuning of the specific server instance, mounting a storage server disk image, and configuring security parameters.

When a particular event is ready to begin broadcasting, the server also needs to be configured for that event. This configuration is accomplished by running scripts that were installed as part of the initialization package. The configuration includes, for example, information indicating: (1) whether the server should act as an Origin, Relay, or Edge for the broadcast; (2) whether or not to record the broadcast; (3) what licensing restrictions to use for the broadcast (e.g., limiting the number of viewers 218); and what security token and parameters to use for the broadcast.

When a streaming server is first acquired, a scheduled checkup is set to assess whether or not the server is still necessary. At each checkup, the server is checked for reserved bandwidth. If no bandwidth is reserved on the server, then it is released. Otherwise, it is left running and another checkup is scheduled for later (e.g., in one hour). By keeping the streaming servers in order and allocating bandwidth according to that ordering, a server will rarely remain in use long if it is not needed.

The bandwidth usage for an event is estimated based on the history of actual bandwidth usage for the particular broadcasting device 208 that is streaming the event and may also be influenced by other factors, such as the content provider's market segment, the starting date, time, and duration of the event, and/or hard limits on the number of viewers 218 or bandwidth setup by the content provider 216 when configuring the event. The estimate may also be influenced by promotional advertising analytics, such as a number of people who indicated interest on a Facebook page setup for the event. In one exemplary embodiment, some or all of these influencing factors are combined into a Bayesian probability model, and the amount of bandwidth is estimated as the mean of the probability distribution.

When an event is underway, the broadcasting device 208 transmits video and audio data to the media servers 212. In one exemplary embodiment, the video and audio data are transmitted using the Real-time Transport Protocol (RTP). The video data and/or the audio data may be encoded/compressed prior to transmission. In one exemplary embodiment, the video data is encoded according to the H.264 standard, using the Baseline Profile (BP). In one exemplary embodiment, the audio data is encoded according to the Advanced Audio Coding (AAC) standard, using the Low Complexity (LC) profile. As part of starting an event, the scheduling logic 220 places an SDP file on the designated media servers 212, which allows the media servers 212 to know how to receive and process the RTP data being sent to it by the broadcasting device 208.

After a live broadcast is completed, the broadcasting device 208 may upload to the storage servers a higher quality (e.g., any one or any two or more of the following: higher video resolution, lower video compression loss; increased audio quality, larger size, and/or increased frame rate) video that was recorded locally during the live broadcast. This is done so that later re-broadcasting does not suffer from the same quality limitations that uplink bandwidth imposes on the initial live broadcast. Accordingly, depending on the configuration of an event, the broadcasting device 208 may store a high-resolution copy of an event that it broadcast. In one exemplary embodiment, the broadcasting device 208 stores a high-resolution copy of an event in addition to broadcasting the event live. In one exemplary embodiment, the broadcasting device 208 stores a high-resolution copy of an event instead of broadcasting the event live.

When the broadcasting device 208 is not busy broadcasting events, a background process running on the broadcasting device 208 sends higher quality (e.g., any one or any two or more of the following: higher video resolution, lower video compression loss; increased audio quality, larger size, and/or increased frame rate) data acquired by the video acquisition device 210 to one or more of the media servers 212 instantiated as storage servers in the media server cloud 222 for storage thereof. A "trickle upload" process 1700 for storing the higher quality data, according to one exemplary embodiment, is shown in FIGS. 17A-17F.

According to the upload process 1700, the broadcasting device 208 encrypts the higher quality (e.g., any one or any two or more of the following: higher video resolution, lower video compression loss; increased audio quality, larger size, and/or increased frame rate) media file with a public key that the scheduling logic 220 has issued to the applicable media servers 212, in step 1702. Next, in step 1704, the broadcasting device 208 sends a UDP "start" packet to the media server 212 with the event identifier, a checksum of the original higher quality media file, and the length of the encrypted file, telling the server that the broadcasting device 208 is initiating the trickle upload process.

If the media server 212 successfully receives the "start" packet from the broadcasting device 208 (steps 1706 and 1708), the media server 212 stores the checksum for later validation and allocates space to hold the encrypted file, in step 1710. The media server 212 then sends a UDP "start response" packet to the broadcasting device 208, indicating that the server is ready to receive data (step 1710).

Next it is determined whether the broadcasting device 208 successfully receives the "start response" packet from the media server 212 (steps 1712 and 1714). If acknowledgment isn't received within a predetermined timeout, the broadcasting device 208 repeats sending of the UDP "start" packet (step 1704). If the broadcasting device 208 receives the "start response" packet from the media server 212, the broadcasting device 208 determines the Path Maximum Transmission Unit (PMTU) between the broadcasting device 208 and the media server 212, in step 1716, to reduce the chances that packets will be fragmented at the Internet Protocol (IP) layer. The broadcasting device 208 divides the encoded higher quality data file up into blocks of PMTU minus H bytes of data, in step 1718, where H is the number of bytes in the headers of the "send" packet, including the application, UDP, and IP headers.

In step 1720, the broadcasting device 208 starts a predetermined number of threads based on a number of outstanding packets the broadcasting device 208 is willing to tolerate. Each of the threads will then perform the following four steps: (1) choose an unsent block from the file in step 1722; (2) mark the block as being in transit in step 1724; (3) send a UDP "send" packet to the media server 212 with the event identifier, the starting offset of the block into the file, the data length, and the data chunk, in step 1726; and (4) wait a predetermined amount of time for a response from the server in step 1728. If the server sends a response, mark the packet as delivered in step 1730. If no response is received, the thread processing returns to step 1726. Next, in step 1732, it is determined if any unsent blocks remain. If unsent blocks do remain, the thread processing restarts at step 1722. If there are no more unsent blocks, the thread exits and processing of the upload process 1700 continues at step 1742.

The media server 212 listens for UDP "send" packets from the broadcasting device 208, in step 1734. Upon receipt of a UDP "send" packet (step 1736), the media server 212 writes the content into the pre-allocated storage at the requested offset (step 1738) and sends a UDP "send response" to the broadcasting device 208 (step 1740).

Once all blocks are sent (step 1742), the broadcasting device 208 sends a UDP "stop" packet to the media server 212 with the event identifier, telling the server that the broadcasting device 208 has sent the entire higher quality file, in step 1744.

If the media server 212 successfully receives the UDP "stop" packet (steps 1746 and 1748), the media server 212 decrypts the received data with its private key and calculates a checksum of the unencrypted file (step 1750). In step 1752, it is determined if this checksum matches the checksum sent by the broadcasting device 208 (in step 1704). If the checksums match, in step 1752, the media server 212 will begin to store the higher quality file in the media server cloud 222 (step 1754). If the checksums do not match, then the decrypted data will be discarded in step 1756. The media server 212 will send a UDP "stop response" packet to the broadcasting device 208 indicating its success or failure (steps 1758 and 1760, respectively).

If the broadcasting device 208 successfully receives the "stop response" packet (steps 1762 and 1764), the "stop response" packet is evaluated to determine if the file was successfully delivered (step 1766). Thus, if the status in the "stop response" packet indicates that the file delivery was successful, the broadcasting device 208 considers this transfer complete. If the status in the "stop response" packet indicates that the file delivery was unsuccessful, the broadcasting device 208 will restart processing of the upload process 1700 at step 1702. If the broadcasting device 208 does not receive the "stop response" packet (steps 1762 and 1764), processing of the upload process 1700 continues at step 1744.

The viewer 218 views an event through a URL provided by the content provider 216. The URL could be provided, for example, as a hyperlink in an e-mail or on the a website (e.g., the content provider's site). The URL is constructed for the broadcast by an API of the scheduling logic 220. The URL points to a customized video player (e.g., Flash with ActionScript) that holds a secure token, the URL, and parameters for the event's VOD or Edge server. If the event is ticketed, it also supplies a unique token within the parameters. These tokens are available according to the content provider's licensing configuration. This is the only interaction between the viewer 218 and the scheduling logic 220, i.e., to retrieve a customized viewer based on the broadcast requested and the viewer's access privileges.

The viewer 218 similarly has no direct access to the media servers 212. The viewer 218 can only access the video stream on a media server 212 (Edge or VOD) through the customized video player (e.g., Flash and ActionScript) that was supplied by the scheduling logic 220. The video steam is encrypted and authenticated by a secure token (and optionally a unique viewer token) to prevent any unauthorized access to the video content.

As noted above, a broadcast can be configured to require unique tokens or tickets. In order to view such a broadcast, each viewer 218 must pass a unique token to the media server 212 which will lookup the token and insure that it is not a violation of its restrictions to allow viewing of the video. If the token is not found in a lookup database of the media servers 212, then access to the video is refused.

If the token is found in the lookup database, it can be used to impose various restrictions, for example: (1) restrictions on the number of simultaneous viewers (e.g., a restriction on one simultaneous viewer would allow the viewer if there were no open viewers using the same token, but would refuse access if such a viewer was already open); (2) restrictions on viewer time, such as restricting viewing to a specific time period and/or a specific amount of cumulative viewing time; (3) restrictions on the amount of bandwidth consumed by viewers with the token; (4) group restrictions wherein a group of tokens are cumulatively restricted according to simultaneous viewer count, specific date/time ranges, cumulative viewing time, and/or bandwidth limits; and (5) restrictions that differ for viewing an event live and viewing a pre-recorded version of the event.

The unique tokens and their corresponding restrictions are managed by the scheduling logic 220 as part of the account and event setup. A user interface provided by the scheduler website keeps this management simple by providing sets of common restrictions for different types of events. The selected restrictions are then communicated to the media server 212 as part of event configuration.

FIGS. 18-22 show screen shots from a user interface 1800, according to one exemplary embodiment, provided by the scheduler website implemented by the scheduling software 202 running on the server computer 204 (i.e., the scheduling logic 220). These screen shots illustrate a scenario by which a user or administrator (e.g., the content provider 216) could schedule an event to be broadcast by an autonomous broadcasting system (e.g., the autonomous broadcasting system 200) as a live video stream.

In this example, the administrator shares a link (corresponding to a URL) with potential viewers of a video stream. It is assumed that a broadcasting device of the autonomous broadcasting system has already been registered with the website. If the broadcasting device and any related hardware (e.g., a video acquisition device) are working, the event will automatically be broadcasted as the live video stream to as many of the potential viewers as request or otherwise connect to the live video stream. The autonomous broadcasting system is readily scalable based on many factors (e.g., a number of requesting viewers) since the system uses cloud computing to dynamically add servers as needed.

Figure 18:
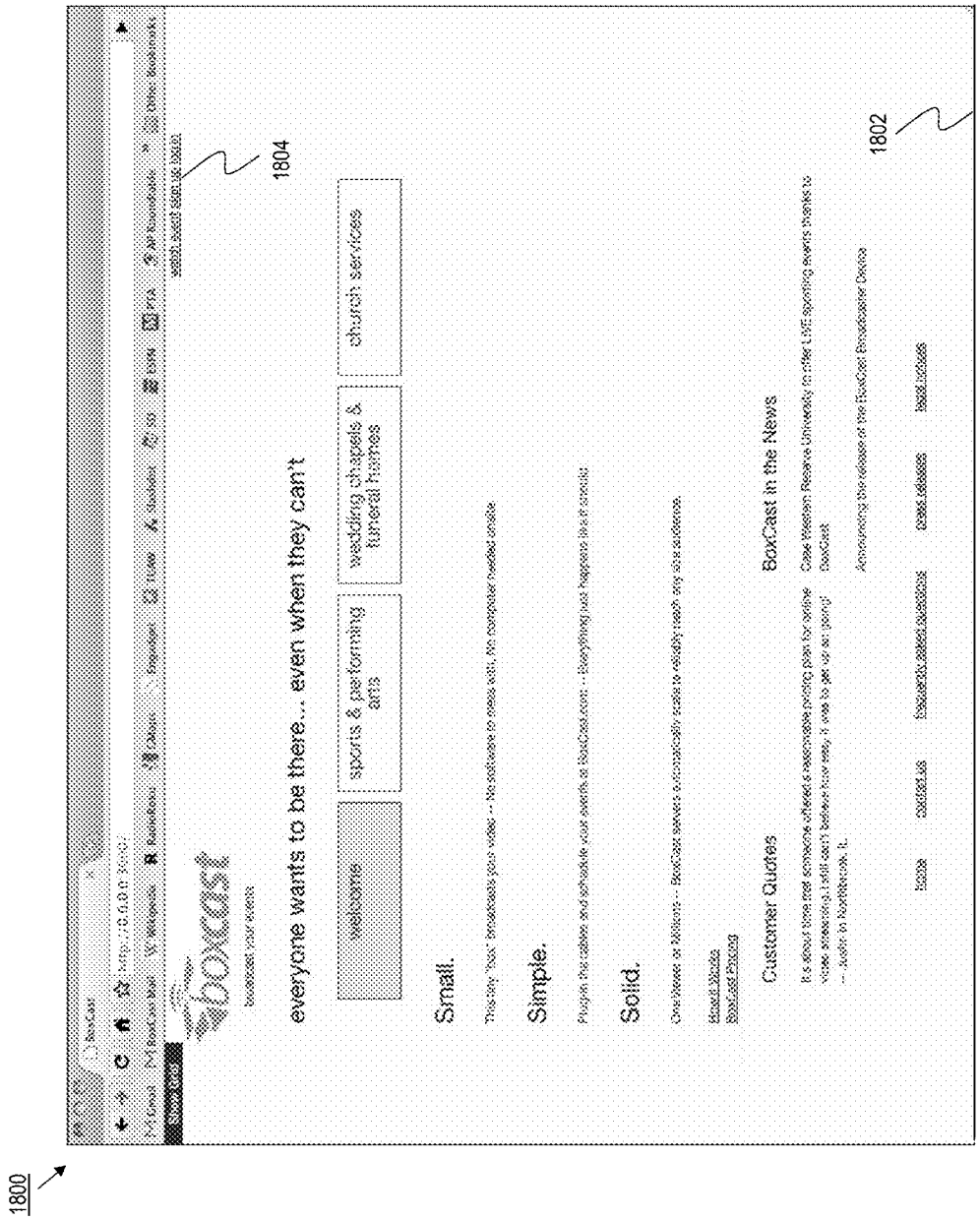
FIG. 18 is a screen shot of a user interface, according to one exemplary embodiment, displaying a home page of a scheduler website.

The user interface 1800 includes a webpage 1802 shown in FIG. 18, which is displayed as a result of a user (e.g., the content provider 216) visiting the scheduler website (e.g., at www.boxcast.com) using a computer (e.g., the computer 100) running a web browser. The webpage 1802 represents a home page of the scheduler website that initially appears, unless the user had selected "keep me signed in" during his last session. The webpage 1802 includes a login link 1804.

Figure 19:
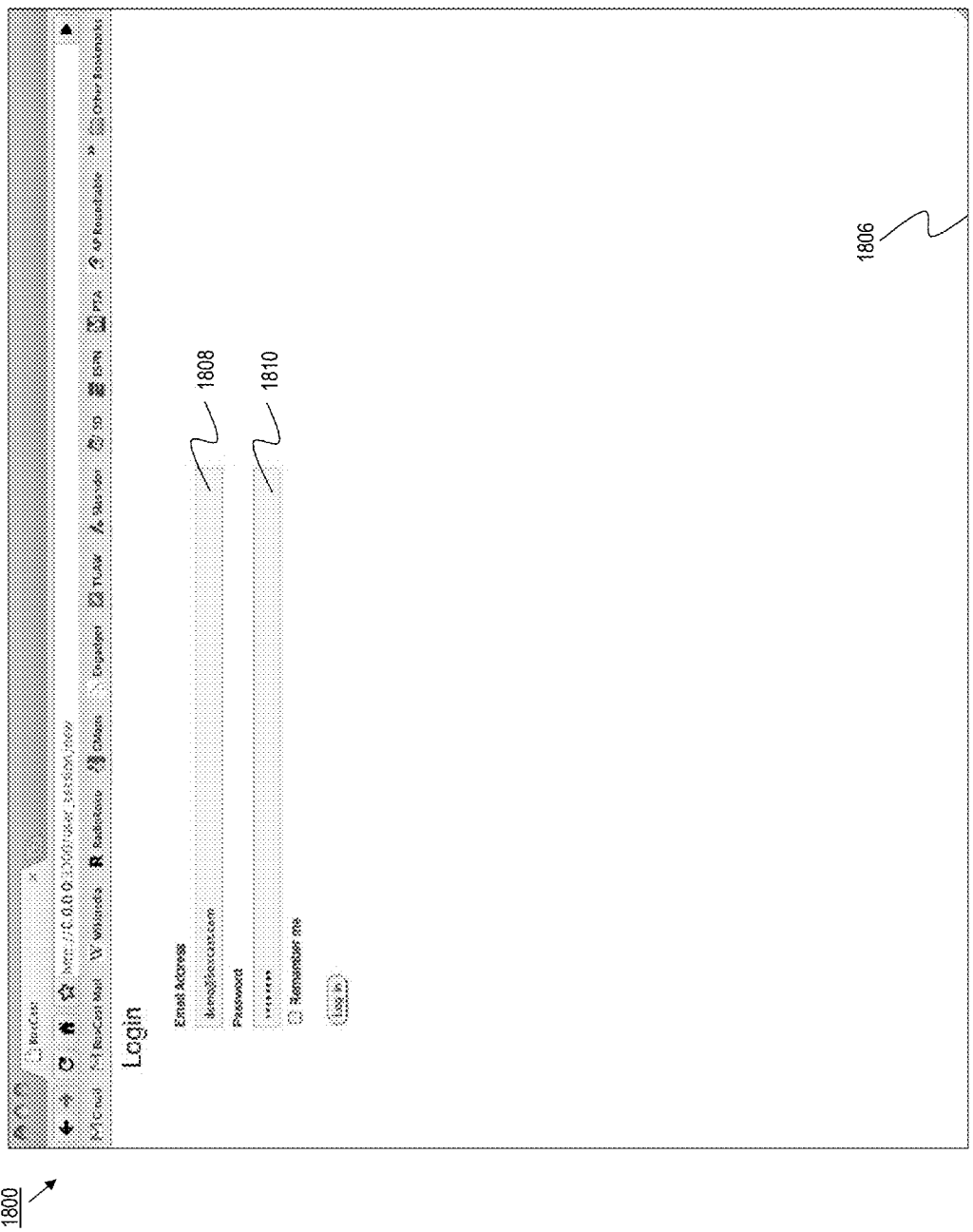
FIG. 19 is a screen shot of a user interface, according to one exemplary embodiment, displaying a login page of a scheduler website.

If the user clicks on or otherwise selects the login link 1804, the user interface 1800 displays a webpage 1806, as shown in FIG. 19, which prompts the user to login to the scheduler website by entering a username 1808 (e.g., an e-mail address) and a password 1810.

Figure 20:
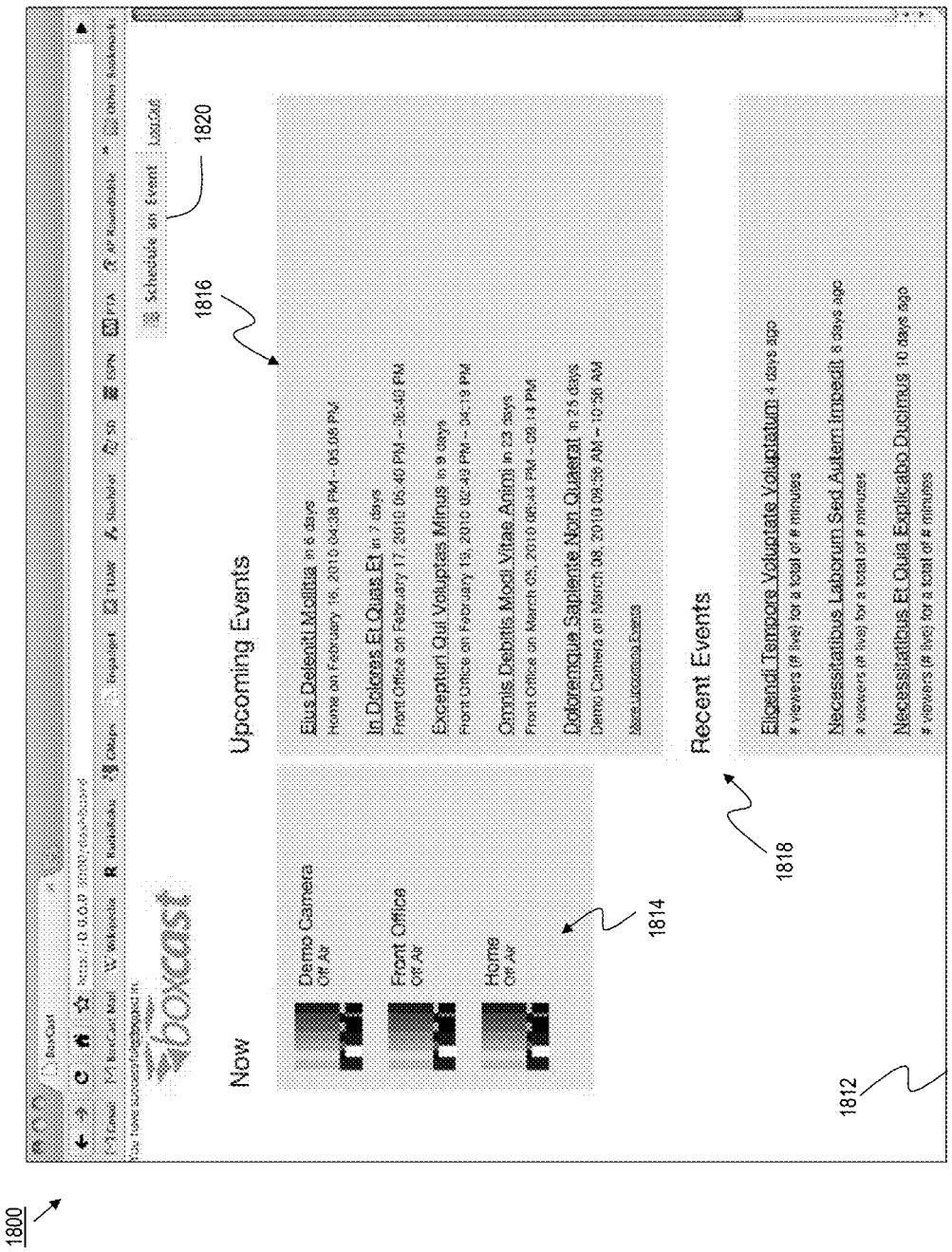
FIG. 20 is a screen shot of a user interface, according to one exemplary embodiment, displaying a user's event page within a scheduler website.

Once the user inputs his credentials (i.e., the username 1808 and password 1810) and the credentials are authenticated by the system, the user is taken to his main webpage 1812 as shown in FIG. 20. This main page 1812 shows, for example, a status of broadcasting devices 1814 (including any events that are currently being broadcast), a list of upcoming events 1816, and a list of recent events 1818, associated with the user. The main webpage 1812 includes a "schedule an event" link 1820.

Figure 21:
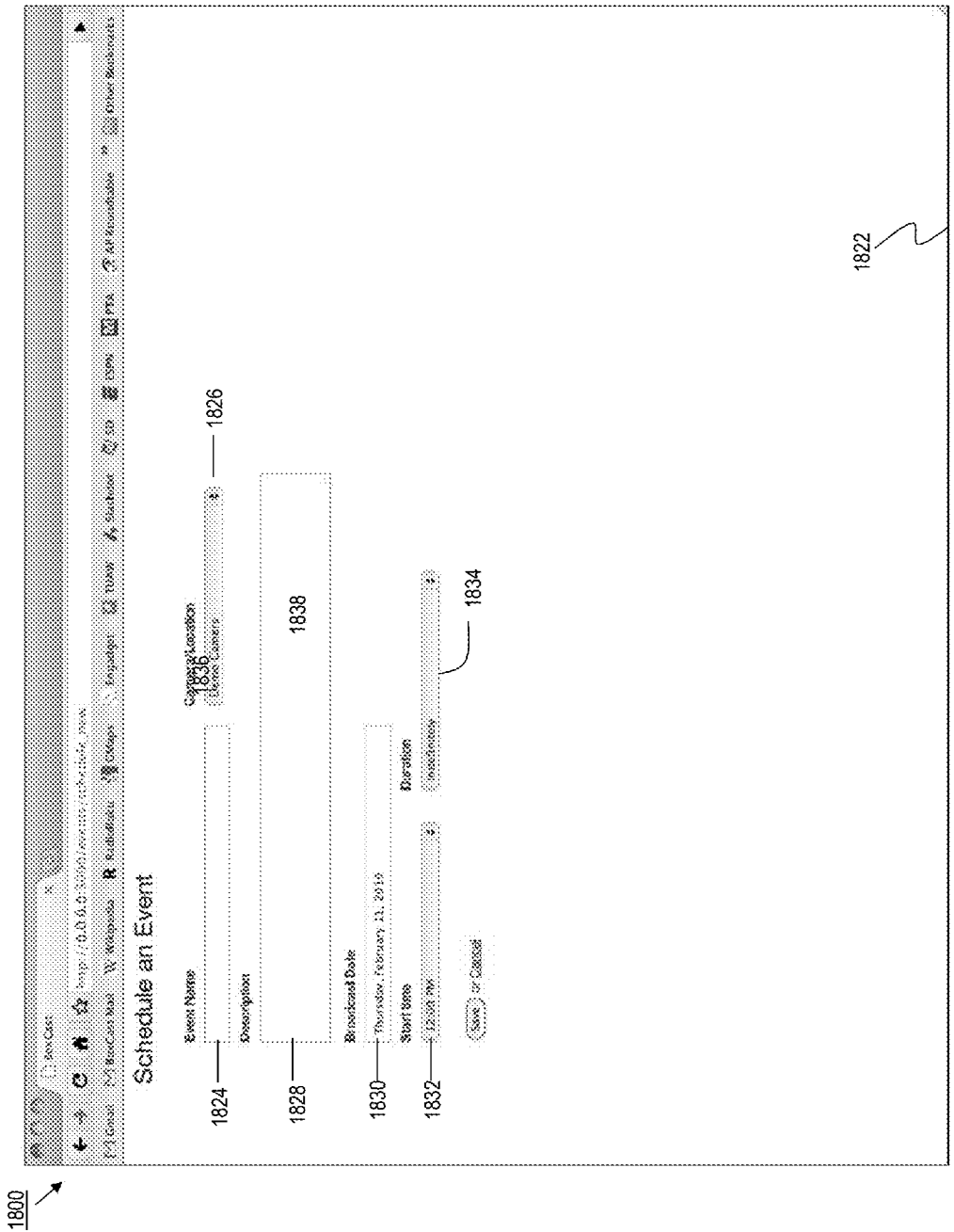
FIG. 21 is a screen shot of a user interface, according to one exemplary embodiment, displaying an even scheduling page of a scheduler website.
Figure 22:
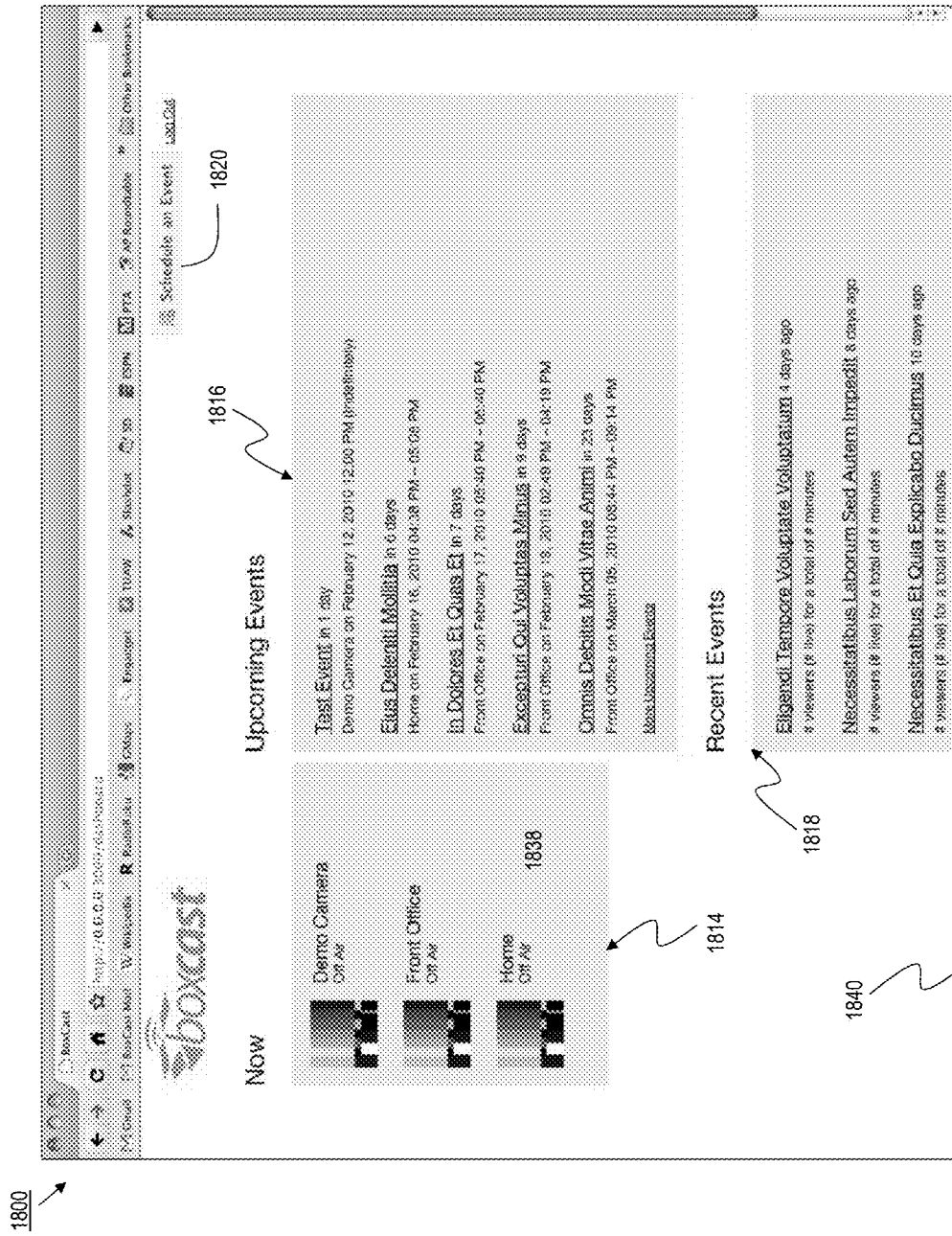
FIG. 22 is a screen shot of a user interface, according to one exemplary embodiment, displaying a modified version of the user's event page of FIG. 20.

If the user clicks on or otherwise selects the "schedule an event" link 1820, the user interface 1800 displays a webpage 1822, as shown in FIG. 21, which prompts the user to input information for the new event to be scheduled. This information includes a name 1824, a location or associated broadcasting device 1826, a description 1828, a broadcast date 1830, a start time 1832, and a duration 1834, for the event. The webpage 1822 also includes a save link 1836 and a cancel link 1838. If the user clicks or otherwise selects the cancel link 1838, the event scheduling ends and the user is returned to his main page 1812. If the user clicks or otherwise selects the save link 1836, the new event is scheduled and the user is returned to a webpage 1840 representing an updated version of his main page 1812. The webpage 1840, as shown in FIG. 22, includes the newly scheduled event in the list of upcoming events 1816.

The selected broadcasting device 208 of the autonomous broadcasting system will broadcast the event to one or more media servers on the selected broadcast date and start time for the selected duration. Accordingly, users will be directed from a link corresponding to the new event, as displayed, for example, on the webpage 1802 or a similar page at www.boxcast.com or as a link in an e-mail, to view the live video stream being broadcast for the event.

The systems and methods of the present invention can be implemented on a variety of platforms including, for example, networked computer systems and stand-alone computer systems. Additionally, the logic and databases shown and described herein preferably reside in or on a computer readable medium such as, for example, a Read-Only Memory (ROM), Random-Access Memory (RAM), programmable read-only memory (PROM), electrically programmable read-only memory (EPROM), electrically erasable programmable read-only memory (EEPROM), magnetic disk or tape, and optically readable mediums including CD-ROM and DVD-ROM. Still further, the processes and logic described herein can be merged into one large process flow or divided into many sub-process flows. The order in which the process flows herein have been described is not critical and can be rearranged while still accomplishing the same results. Indeed, the process flows described herein may be rearranged, consolidated, and/or re-organized in their implementation as warranted or desired.

The above description of specific embodiments has been given by way of example. From the disclosure given, those skilled in the art will not only understand the general inventive concepts and their attendant advantages, but will also find apparent various changes and modifications to the structures and methods disclosed. For example, although the above exemplary embodiments reference streaming of video data and video data including audio data, the general inventive concepts can be extended to include the acquiring and streaming of audio data only. It is sought, therefore, to cover all such changes and modifications as fall within the spirit and scope of the general inventive concept, as defined by the appended claims and equivalents thereof.

The invention claimed is:

1. A method comprising:
situating an autonomous broadcast device (ABD) behind a router; and
establishing an Internet connection for the ABD behind the router, wherein the router prevents remote access to the ABD from outside the router,
wherein, the ABD autonomously performs the following actions without any modification to or circumvention of the router:
issue a request via the Internet connection to a first server situated outside the router and receive data relating to a recording start time of a live event from the first server in response to the request;
receive digital content of the live event after the recording start time from a digital recording device proximate to the live event;
transmit streaming information via the Internet connection to a second server, wherein the second server is configured to stream the digital content to a plurality of users;
transmit the digital content via the Internet connection to the second server contemporaneously with the live event and based on the data relating to the recording start time;
receive data relating to a recording end time for the live event from the first server via the Internet connection; and
cease transmission of the digital content based on the data relating to the recording end time.

2. The method of claim 1, wherein the ABD lacks a user interface permitting a user to input the recording start time of the live event via the ABD.

3. The method of claim 1, wherein the router comprises a firewall.

4. The method of claim 1, wherein the first server and second server are the same server.

5. The method of claim 1, wherein the second server comprises a plurality of servers.

6. A method comprising:
situating an autonomous broadcast device (ABD) behind a router; and
establishing an Internet connection for the ABD behind the router, wherein the router prevents remote access to the ABD from outside the router,
wherein, the ABD autonomously performs the following actions without any modification to or circumvention of the router:
issue a request via the Internet connection to a server situated outside the router and receive data relating to a recording start time of a live event from the server in response to the request;
receive digital content of the live event after the recording start time from a digital recording device proximate to the live event;
transmit streaming information via the Internet connection to the server; and
transmit the digital content via the Internet connection to the server contemporaneously with the live event and based on the data relating to the recording start time, wherein the digital content is transmitted out of band from the streaming information.

7. The method of claim 6, wherein the streaming information is transmitted using a first protocol and the digital content is transmitted using a second protocol.

8. The method of claim 6, wherein the server is configured to stream the content to a plurality of users and the router comprises a firewall.

9. The method of claim 6, wherein the ABD lacks a user interface permitting a user to input the recording start time of the live event via the ABD.

10. The method of claim 6, wherein the ABD autonomously receives data relating to a recording end time for the live event from the server via the Internet connection, and wherein the ABD ceases transmission of the digital content based on the data relating to the recording end time.

11. The method of claim 6, wherein the server comprises a plurality of servers.

12. A system comprising:
an autonomous broadcasting device (ABD) situated behind a router;
scheduling logic remote from and in data communication with the ABD over a network; and
a server,
wherein the scheduling logic interfaces with a first user to allow the first user to set a recording start time for a live event,
wherein, in response to a request initiated autonomously by the ABD, the scheduling logic transmits data relating to the recording start time to the ABD over the network without modification or circumvention of the firewall, wherein, based on the data relating to the recording start time, the ABD autonomously transmits video data of the live event without modification or circumvention of the firewall contemporaneously with the live event from a video acquisition device to the server over the network, and
wherein the server transmits the video data as a live video stream to a second user over the network.

13. The system of claim 12, wherein the first user, the second user, and the ABD are remote from one another.

14. The system of claim 12, wherein the scheduling logic stores the data relating to the recording start time in a schedule associated with the ABD.

15. The system of claim 12, wherein the scheduling logic is stored on the server.

16. The system of claim 12, wherein the scheduling logic interfaces with the first user to allow the first user to set a recording end time for the live event and transmits data relating to the recording end time to the ABD over the network, and
wherein, based on the data relating to the recording end time, the ABD ceases transmission of the video data captured by the video acquisition device.

17. The system of claim 16, wherein the scheduling logic stores the data relating to the recording end time in the schedule.

18. The system of claim 12, wherein the scheduling logic stores usage information of the second user.

19. The system of claim 18, wherein the usage information comprises an IP address of the second user.

20. The system of claim 18, wherein the usage information comprises a viewing duration of the second user.

21. The system of claim 12, wherein the router comprises a firewall.

22. A method comprising:
receiving and storing on a server schedule data from a first user, the schedule data comprising data relating to a recording start time for a live event;
in response to a request from an autonomous broadcasting device (ABD), transmitting the data relating to the recording start time to the ABD, wherein the ABD is remote from the server and situated behind a router, and wherein the request is initiated autonomously by the ABD and no modification to or circumvention of the router is necessary for communication between the ABD and the server;
receiving streaming information from the ABD;
receiving a first transmission of digital content of the live event from the ABD contemporaneously with the live event and based on the data relating to the recording start time; and
contemporaneously with the live event, streaming the digital content to a plurality of second users.

23. The method of claim 22, wherein the streaming information is received out of band from the digital content.

24. The method of claim 22, wherein the schedule data further comprises data relating to a recording end time for the live event, the method further comprising, in response to a request from the ABD, transmitting the data relating to the recording end time to the ABD.

25. The method of claim 22, further comprising dynamically scaling the server based on demand for the digital content being streamed to the plurality of second users.

26. The method of claim 22, further comprising storing the digital content and streaming the digital content to a user after the live event has concluded.

27. The method of claim 22, further comprising logging usage statistics for at least one of the plurality of second users.

28. The method of claim 27, wherein the usage statistics comprise an IP address of the at least one of the plurality of second users.

29. The method of claim 27, wherein the usage statistics comprise a viewing duration of the at least one of the plurality of second users.

30. The method of claim 22, wherein the server comprises a plurality of servers and the router comprises a firewall.

* * * * *

(12) INTER PARTES REVIEW CERTIFICATE (3929th)

United States Patent
Daily et al.

(10) Number: US 9,686,574 K1
(45) Certificate Issued: Mar. 12, 2025

(54) SYSTEMS AND METHODS FOR AUTONOMOUS BROADCASTING

(71) Applicants: Gordon R. Daily; Justin R. Hartman; Joel S. Helbling; Ronald C. Hopper

(72) Inventors: Gordon R. Daily; Justin R. Hartman; Joel S. Helbling; Ronald C. Hopper

(73) Assignee: BOXCAST INC.

Trial Number:

IPR2022-00066 filed Oct. 15, 2021

Inter Partes Review Certificate for:

Patent No.: 9,686,574
Issued: Jun. 20, 2017
Appl. No.: 15/188,341
Filed: Jun. 21, 2016

The results of IPR2022-00066 are reflected in this inter partes review certificate under 35 U.S.C. 318(b).

INTER PARTES REVIEW CERTIFICATE
U.S. Patent 9,686,574 K1
Trial No. IPR2022-00066
Certificate Issued Mar. 12, 2025

AS A RESULT OF THE INTER PARTES REVIEW PROCEEDING, IT HAS BEEN DETERMINED THAT:

Claims 1-30 are cancelled.

\* \* \* \* \*